United States Patent
Indino et al.

(10) Patent No.: US 12,179,329 B2
(45) Date of Patent: Dec. 31, 2024

(54) METHOD FOR DETECTING A KICKBACK OR A BREAKTHROUGH OF A MACHINE TOOL WITH AN OSCILLATING OUTPUT MOVEMENT, DEVICE, AND MACHINE TOOL COMPRISING THE DEVICE

(71) Applicant: Robert Bosch GmbH, Stuttgart (DE)

(72) Inventors: Ruggero Indino, Nufringen (DE); Daniel Dennis, Nuertingen (DE); Alejandro Rostro Quijano, Freiburg (DE); Simon Riggenmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 18/003,277

(22) PCT Filed: Jul. 1, 2021

(86) PCT No.: PCT/EP2021/068111
§ 371 (c)(1),
(2) Date: Dec. 23, 2022

(87) PCT Pub. No.: WO2022/008328
PCT Pub. Date: Jan. 13, 2022

(65) Prior Publication Data
US 2023/0249326 A1 Aug. 10, 2023

(30) Foreign Application Priority Data
Jul. 7, 2020 (DE) .................... 10 2020 208 479.3

(51) Int. Cl.
*B25D 16/00* (2006.01)
*H02H 7/085* (2006.01)

(52) U.S. Cl.
CPC ........... *B25D 16/00* (2013.01); *H02H 7/0854* (2013.01); *B25D 2250/221* (2013.01)

(58) Field of Classification Search
CPC .............. B25D 16/00; B25D 2250/221; B25D 2250/201; B25D 11/005; B25D 11/00; B25F 5/00; B25F 3/00
(Continued)

(56) References Cited

U.S. PATENT DOCUMENTS

| | | | | |
|---|---|---|---|---|
| 2016/0048122 A1* | 2/2016 | Lukosz | ............... | G05B 19/4183 700/114 |
| 2016/0375570 A1* | 12/2016 | Boeck | ................ | G05B 19/4062 700/169 |

FOREIGN PATENT DOCUMENTS

| | | |
|---|---|---|
| DE | 10 2013 201 708 A1 | 8/2014 |
| DE | 102014226369 A1 * | 6/2016 |

(Continued)

OTHER PUBLICATIONS

International Search Report corresponding to PCT Application No. PCT/EP2021/068111, mailed Nov. 5, 2021 German and English language document) (5 pages).

*Primary Examiner* — Jacob A Smith
(74) *Attorney, Agent, or Firm* — Maginot, Moore & Beck LLP

(57) ABSTRACT

In a method for identifying a deflection or a breakdown of a machine tool, in particular a hand-held machine tool, with an oscillating output movement, in particular a linearly oscillating output movement, at least one physical characteristic of the machine tool, in particular of a motor, a powertrain component, and/or a machining tool of the machine tool, is detected continuously or periodically by means of a detection unit. The method further includes detecting a deflection or a breakdown of the machine tool with an analysis unit on the basis of at least two values, which are identified at different times, of the characteristic of the machine tool, wherein each of the at least two values of the characteristic are associated with at least one respective (Continued)

substantially identical value of a discrete position characteristic of the oscillating output movement, in particular the linearly oscillating output movement, of the machine tool.

15 Claims, 6 Drawing Sheets

(58) Field of Classification Search
USPC .................................................. 173/162.1, 90
See application file for complete search history.

(56) References Cited

FOREIGN PATENT DOCUMENTS

| EP | 1 461 187 B1 | 9/2008 |
| EP | 2 855 098 B1 | 3/2017 |

* cited by examiner

METHOD FOR DETECTING A KICKBACK OR A BREAKTHROUGH OF A MACHINE TOOL WITH AN OSCILLATING OUTPUT MOVEMENT, DEVICE, AND MACHINE TOOL COMPRISING THE DEVICE

This application is a 35 U.S.C. § 371 National Stage Application of PCT/EP2021/068111, filed on Jul. 1, 2021, which claims the benefit of priority to Serial No. DE 10 2020 208 479.3, filed on Jul. 7, 2020 in Germany, the disclosures of which are incorporated herein by reference in their entirety.

BACKGROUND

A method for identifying a deflection or a breakdown of a machine tool with an oscillating output movement has already been proposed, wherein in at least one method step at least one physical characteristic of the machine tool is detected continuously or periodically by means of a detection unit.

SUMMARY

The disclosure proceeds from a method for identifying a deflection or a breakdown of a machine tool, in particular of a hand-held machine tool, with an oscillating, in particular linearly oscillating, output movement, wherein in at least one method step, by means of a detection unit, at least one physical characteristic of the machine tool, in particular of a motor, of a powertrain component, and/or of a machining tool of the machine tool is detected continuously or periodically.

It is proposed that, in at least one method step, a deflection or a breakdown of the machine tool is identified by means of an analysis unit as a function of at least two values, which are detected at different times, of the characteristic of the machine tool, wherein the at least two values of the characteristic are associated with a respective at least substantially identical value of a discrete position characteristic of the oscillating, in particular linearly oscillating, output movement of the machine tool.

The term "substantially identical" should in particular be understood to mean that two values, in particular the two values, which are detected at different times, of the characteristic differ by at most 10%, preferably at most 5%, and particularly preferably at most 3%, of a maximum value of the two values. The term "physical characteristic" should in particular be understood to mean a characteristic of an object, in particular of the machine tool, of the motor, of the powertrain component, and/or of the machining tool of the machine tool, the characteristic describing at least one physical property of the object. In particular, the physical characteristic is designed such that a deflection or a breakdown of the machine tool affects a value of the physical characteristic. The physical characteristic is preferably designed as a rotation speed of the motor or as a time of a specific signal curve in a detected magnetic signal or a detected current signal of the motor. The term "deflection" of a machine tool should in particular be understood to mean spontaneous movement of the machine tool generated by interaction of the machining tool of the machine tool with a workpiece to be machined and/or with another object. In particular, during the deflection, the machine tool is moved away from the workpiece and/or the other object or is moved toward the workpiece and/or the other object. A cause of a deflection of the machine tool may in particular also be a jamming of the machining tool in or on a workpiece. In particular, jamming of a machine tool with an oscillating, in particular linearly oscillating, output movement results in reciprocating motion of the entire machine tool and/or in spontaneous oscillating force transmission to the machine tool and a user. The term "breakdown" should in particular be understood to mean a movement of the machine tool caused by a spontaneous elimination of an interaction of the machining tool of the machine tool with a workpiece to be machined, wherein, in particular, a portion of a force exerted on the workpiece by the machine tool, for example, by piercing and/or cutting the workpiece, is at least substantially directly converted into a movement of the machine tool. In particular, movement during the breakdown takes place in a direction that at least substantially corresponds to a machining direction of the previously machined workpiece. The deflection and the breakdown are preferably each designed as a jerky movement relative to a regular guide movement of the machine tool. In particular, both the deflection and the breakdown of the machine tool have high potential for injury when a user uses the machine tool. The term "position characteristic" should in particular be understood to mean a characteristic of the oscillating output movement of the machine tool, the position characteristic describing or indicating a movement and/or a position of the machining tool performing the output movement or of an output element, such as a lift rod, of the machine tool performing the output movement, within a period of the output movement, wherein the position characteristic has exactly one value for each point within a period of the output movement. Preferably, the position characteristic is designed as an acceleration vector or a velocity vector of the machining tool or the output element, or as a characteristic of the machine tool dependent thereon, in particular of the motor, such as a number of rotations, signal spikes, or the like of the motor, or a time of these characteristics within a period of output movement. In particular, a type of the position characteristic depends on a type of the detected physical characteristic of the machine tool. For example, the characteristic is designed as a rotation speed of the motor of the machine tool, wherein the position characteristic is, for example, designed as a time of a periodically recurring position and/or movement of the machining tool and/or of a periodically recurring state in the oscillating, in particular linearly oscillating, output movement of the machine tool. Preferably, the position characteristic has a discrete number of different values, which is distributed, in particular evenly, over a period of the oscillating, in particular linearly oscillating, output movement of the machine tool. The term "period" of the oscillating, in particular linearly oscillating, output movement should in particular be understood to mean a smallest time interval in which the output movement repeats during operation of the machine tool. In particular, the period of the oscillating, in particular linearly oscillating, output movement is a time period that the machining tool needs to run through exactly one movement cycle during operation of the machine tool. Preferably, the machining tool has an at least substantially identical position, speed, and acceleration at a start of the movement cycle and an end of the movement cycle.

The term "oscillating output movement" should in particular be understood to mean an output movement of the machine tool in which an output element, such as a lift rod, and/or the machining tool of the machine tool oscillatingly reciprocates along a movement path, wherein within a period of the output movement, the movement path is in particular traversed once in one direction and once in an opposite direction. In a "linearly oscillating output movement," the movement path is preferably designed to be at least substantially linear. The term "substantially linear" should in particular be understood to mean an extension of an object, in particular of the movement path, in which tangents to the longest side surfaces of the object, in particular along the movement path, span an angle with a main extension axis of the object of less than 8°, preferably less than 5°, and more preferably less than 2°, and are most preferably parallel to the main extension axis of the object.

Preferably, the physical characteristic is detected by means of the detection unit in operating states of the machine tool in which the machining tool is moved. Preferably, the physical characteristic is detected by means of the detection unit at a frequency of at least 50 Hz, preferably at least 100 Hz, more preferably at least 200 Hz, and particularly preferably at least 750 Hz, wherein the frequency in particular indicates a number of values of the characteristic detected within a second. Preferably, in at least one method step, in particular prior to an analysis of the characteristic, a detected time curve of the physical characteristic is filtered, in particular to reduce noise effects, by means of the analysis unit or the detection unit in order to identify a deflection or a breakdown by the analysis unit. It is also conceivable that individual values of the physical characteristic are respectively filtered with regard to noise effects, for example by comparison with a noise limit value of the characteristic and/or respectively other values of the physical characteristic, with which is preferably associated a respective identical or similar value of the position characteristic as with the respective individual value. Preferably, the two values, which are detected at different times, of the characteristic are detected in different periods of the oscillating, in particular linearly oscillating, output movement. Preferably, in at least one method step, in order to identify a deflection or a breakdown, a change of the physical characteristic, in particular of the time curve of the characteristic, is determined relative to a last detection time of the characteristic, at which an at least substantially identical value of the position characteristic was associated with the characteristic as at an instantaneous detection time, in particular, of a value of the characteristic used to determine the change. Preferably, in at least one method step, a deflection or a breakdown of the machine tool is identified by means of the analysis unit as a function of the two detected values of the characteristic that were respectively detected at a time at which the machining tool has a position in particular position characteristic, that is at least substantially identical, and/or the output movement of the machine tool has an at least identical magnitude of the position characteristic. Particularly preferably, a deflection or a breakdown is identified by means of the detection unit and/or the analysis unit within at most 20 ms, preferably at most 10 ms, and more preferably at most 5 ms.

By the embodiment of the method according to the disclosure, an advantageously fast identification of deflections and breakdowns can be made possible in machine tools with linearly reciprocating output and/or with a mechanism for generating linear movement from a rotational movement of the motor, e.g., saber saws. In particular, with such machine tools, during a stroke of a machining tool, in particular also when idle, strong fluctuations in rotation speed arise, whereby identification of deflections and breakdowns of the machine tool only via a comparison of values of the rotation speed is made more difficult and/or is possible only over a longer period of time. In order to reliably identify a decrease in rotation speed due to a deflection or a breakdown in machine tools with an oscillating, in particular linearly oscillating, output movement, strong filtering of a time curve of the rotation speed would be necessary, wherein an identification time of the deflection or of the breakdown is increased due to a phase delay resulting therefrom. As a result of the embodiment of the method according to the disclosure, in particular by taking into account the position characteristic when selecting the values of the characteristic to be compared, such strong filtering of the rotation speed can be advantageously omitted. When using the machine tool, an advantageously high level of safety for a user can be achieved, in particular because fast identification of deflections and breakdowns can achieve advantageously fast deactivation or deceleration of the machining tool, thereby advantageously reducing a risk of injury to the user. Advantageously, a service life of the machine tool and/or of the machining device can be increased because increased loading during or after a deflection or breakdown can be advantageously prevented and/or a duration of the increased loading can be advantageously shortened.

Furthermore, it is proposed that in at least one method step, at least one value of the position characteristic is respectively associated with detected values, in particular specific or all detected values, of the characteristic as a function of a detection time by means of the analysis unit. An advantageously fast selection of the values of the characteristic can be made possible in order to identify a deflection or breakdown of the machine tool. Preferably, exactly one value of the position characteristic is respectively associated with specific or all detected values of the characteristic by means of the analysis unit. Preferably, in order to identify a breakdown or a deflection, the detected values of the characteristic are respectively selected by means of the analysis unit as a function of a value of the position characteristic associated with the individual values of the characteristic. Particularly preferably, one value of the characteristic and one value of the position characteristic associated with the value of the characteristic respectively have a detection time that is at least substantially identical. In particular, a value of the characteristic associated with a value of the position characteristic comprises a detection time, which is closer to a detection time of the value of the position characteristic with which the value of the characteristic is associated than all other detected values of the characteristic. In particular, for a number of values of the position characteristic that is less within a time interval, in particular a period of output movement, than a number of values of the characteristic, it is conceivable that a respective value of the position characteristic is associated only with specific detected values of the characteristic, wherein the values of the characteristic are in particular selected that have an at least substantially identical detection time as a value of the position characteristic or that have a detection time that is closer to a detection time of a value of the position characteristic than all other detected values of the characteristic. Preferably, the characteristic, in particular values of the characteristic, is respectively detected by means of the detection unit only for particular predetermined values of the position characteristic. In particular, the characteristic is respectively detected by means of the detection unit only at detection times with which a particular predetermined value of the position characteristic is associated. In order to identify a deflection or breakdown of the machine tool, an advantageously small number of values of the characteristic to be detected and analyzed can be made possible. An advantageously simple and inexpensive embodiment of the detection unit and/or of the analysis unit can thereby be achieved. However, it is also conceivable that the characteristic is at least substantially continuously detected by means of the detection unit, in particular independently of the position characteristic, wherein at least two values of the characteristic are preferably respectively selected for a predetermined value of the position characteristic in order to identify a deflection or a breakdown.

In addition, it is proposed that in at least one method step, the analysis unit determines a difference or a quotient of the at least two values, which are detected at different times, of the characteristic and compares it to at least one limit value in order to identify a deflection or a breakdown of the machine tool. An advantageously fast and simple identification of a deflection or of a breakdown of the machine tool can be made possible. It is conceivable that more than one limit value for identifying a deflection or a breakdown of the machine tool is stored in the analysis unit and/or in a memory unit. In particular, in at least one method step, as a function of an operating state of the machine tool, of a spatial location of the machine tool, of a machining movement of the machine tool by a user, of a type of a workpiece to be machined, or the like, the analysis unit selects at least one limit value for comparison with the difference or the quotient. Preferably, if the limit value is exceeded, the analysis unit outputs at least one electrical and/or electronic control signal, which in particular signals an identification of a deflection or of a breakdown. The term "control signal" should in particular be understood to mean an electrical and/or electronic signal, such as a voltage signal or current signal, and/or a digital data packet, which is provided to control, by processing by means of an electronic control unit, at least one function of an electrical and/or electronic device, in particular of the machine tool, of a control and/or a regulating unit of the machine tool and/or of the motor of the machine tool. It is conceivable that the analysis unit makes a distinction between a deflection and a breakdown, wherein for a deflection, a different electrical and/or electronic control signal is in particular output than for a breakdown. In order to distinguish between a deflection and a breakdown, the analysis unit uses, for example, a magnitude of the difference or of the quotient that exceeds the limit value, wherein in particular in the case of a deflection, a higher value is determined for the magnitude that exceeds the limit value. It is also conceivable that in order to distinguish between a deflection and a breakdown, the analysis unit analyzes a movement of the machine tool and/or of the machining tool. In particular, during a deflection, the machine tool and/or the machining tool is accelerated in a different direction relative to a previous machining movement than during a breakdown. In particular, at least one function of the machine tool is controlled by means of the electrical and/or electronic control signal. For example, by means of the electrical and/or electronic control signal, the motor of the machine tool is switched off and/or disconnected from a powertrain of the machine tool via a coupling of the machine tool. In particular, the analysis unit adjusts a set rotation speed of the motor of the machine tool via the control signal. Preferably, a rotation speed of the motor is set by means of a control and/or regulating unit of the machine tool as a function of the predetermined adjusted set rotation speed. Alternatively or additionally, it is conceivable that by means of the electrical and/or electronic control signal, in particular in the event of a jamming of the machining tool during a deflection, a motor current of the motor is briefly increased, in particular to break loose the machining tool. Alternatively or additionally, it is conceivable that a rotation speed of the motor is reduced, in particular temporarily, by means of the electrical and/or electronic control signal. Preferably, after a predetermined time interval or upon detection of a further electrical and/or electronic control signal, the analysis unit puts the machine tool, in particular the motor, back into a regular operating state for machining a workpiece. In particular, when the control signal is output by means of the analysis unit, at least one output unit of the machine tool is controlled. Preferably, in particular upon identification of a deflection or of a breakdown, the output unit outputs at least one haptic, acoustic and/or visual signal as a function of the control signal, preferably in order to warn a user of the machine tool and/or other persons in a vicinity of the machine tool. It is conceivable that the physical characteristic, in particular a time curve of the physical characteristic, is filtered by means of the detection unit or by means of the analysis unit, in particular before a selection of the two values of the characteristic, in particular in order to reduce and/or remove noise signals. For example, it is conceivable that the detection unit or the analysis unit determines a moving average of the physical characteristic, carries out an exponential smoothing of the time curve of the characteristic, or applies another low-pass filter known to a person skilled in the art. For example, the exponential smoothing of the time curve of the characteristic takes place via an equation:

$$y_{filter}(t)=\alpha \cdot y(t)+(1-\alpha) \cdot y_{filter}(t-1)$$

with a smoothing factor $\alpha$, which in particular corresponds to a value from a value range between 0.005 and 1.

It is furthermore proposed that, in at least one method step, a magnetic field characteristic or a current characteristic of an electric motor of the machine tool is detected by means of the detection unit, wherein the analysis unit determines the characteristic and/or the position characteristic as a function of the detected magnetic field characteristic or current characteristic. An advantageously cost-efficient embodiment of the machine tool can be achieved, in particular since further sensors in addition to the electric motor and power electronics of the machine tool can be omitted. Advantageously, low production and assembly costs of the machine tool can thereby be made possible. Preferably, the electric motor is designed as a brushless motor, in particular a brushless DC motor. Preferably, the magnetic field characteristic is detected, in particular continuously, by means of Hall probes of the electric motor, which are formed as part of the detection unit. In particular, the current characteristic is detected, in particular continuously, on input terminals of coil pairs of the electric motor by means of sensor elements of the electric motor or of the power electronics, which are formed as part of the detection unit. In particular, each coil pair of the electric motor is respectively controlled with the same electric current, wherein, in particular, different coil pairs of the electric motor are respectively controlled at different times. Preferably, a position and/or a revolution of a rotor of the electric motor is determined by means of the analysis unit via the magnetic field characteristic and/or the current characteristic. Preferably, the position characteristic is determined by means of the analysis unit as a function of the determined position of the rotor and/or a number of determined revolutions of the rotor. Preferably, the magnetic field characteristic is formed as a voltage, which is induced in at least one Hall probe and periodically changes as a result of a movement of a magnet attached to the rotor of the electric motor, during a rotational movement of the rotor relative to the Hall probe. Preferably, the current characteristic is designed as an electric current, which is fed to a coil of the electric motor in order to accelerate the rotor. In particular, commutation of the electric motor takes place on the different coil pairs of the electric motor due to the current characteristic.

Furthermore, it is proposed that in at least one method step, the analysis unit determines the characteristic as a function of a detection time of a detected specific signal curve within a time curve of the magnetic field characteristic or of the current characteristic, wherein the specific signal curve repeats periodically, in particular exactly once, during the output movement. An advantageously fast identification of a deflection or of a breakdown can be enabled, in particular since detection and association of values of the rotation speed of the motor as a characteristic can be omitted. The term "specific signal curve" should in particular be understood to mean a characteristic shape, e.g., a signal edge, a signal peak or a signal plateau with a specific time length, of a time curve of a signal, in particular of the time curve of the magnetic field characteristic or of the current characteristic. Preferably, the time curve of the magnetic field characteristic and the current characteristic are respectively at least substantially designed as a square-wave signal, as a triangle signal, or as a trapezoidal signal. Preferably, at least one time curve of the magnetic field characteristic or of the current characteristic is detected by means of the detection unit. However, it is also conceivable that a plurality of time curves of the magnetic field characteristic or of the current characteristic is detected, wherein, in particular, the specific signal curve is detected in more than one of the time curves. In particular, a total number of different time curves of the magnetic field characteristic or of the current characteristic of the electric motor corresponds to a number of phases over which commutation of the electric motor takes place. Particularly preferably, the specific signal curve is designed as a signal edge in the time curve of the magnetic field characteristic or of the current characteristic, which edge is in particular caused by an increase or decrease of an induced voltage in one of the Hall probes upon passing a magnet attached to the rotor or by an increase or decrease of an electric current fed to one of the coils in order to accelerate the rotor. Preferably, the specific signal curve repeats periodically within a revolution of the rotor as a function of a number of commutation phases of the electric motor. For example, the specific signal curve in a three-phase electric motor repeats three times during a complete revolution of the motor. It is also conceivable that the specific signal curve can be detected by means of the detection unit as a function of an order within a complete revolution of the rotor or a period of the oscillating, in particular linearly oscillating, output movement. For example, the characteristic designed as a detection time of a first signal edge of the magnetic field characteristic or of the current characteristic within a complete revolution of the rotor or a period of the oscillating, in particular linearly oscillating, output movement is detected by means of the detection unit. In particular, the first signal edge of the magnetic field characteristic or of the current characteristic repeats within a complete revolution of the rotor or a period of the oscillating, in particular linearly oscillating, output movement exactly once within the complete revolution of the rotor or the period of the oscillating, in particular linearly oscillating, output movement. Preferably, the physical characteristic is designed as a time interval between two detection times of the specific signal curve. It is also conceivable that the analysis unit determines a plurality of time intervals between detection times of different specific signal curves within the time curve of the magnetic field characteristic or of the current characteristic and, in particular in order to identify a deflection or a breakdown, compares them to previously determined time intervals between detection times of the respective different specific signal curves. Alternatively or additionally, it is conceivable that the physical characteristic is designed as a time interval between specific signal curves within the time curve of the magnetic field characteristic or of the current characteristic, as a clock frequency of half-bridges of the electric motor of the machine tool designed as a brushless DC motor, as a frequency of a phase current of the electric motor of the machine tool designed as a brushless DC motor, or as a vibration characteristic of the machine tool. The term "vibration characteristic" should in particular be understood to mean a characteristic that describes or indicates a periodic vibration of an object, in particular of the machine tool. In particular in an embodiment of the characteristic as a vibration characteristic of the machine tool, the characteristic is filtered by means of the detection unit or the analysis unit with regard to a noise and/or a detected machining movement of the machine tool. Alternatively or additionally, it is conceivable that the physical characteristic is detected by means of the detection unit at least substantially directly on the machining tool, wherein, in particular, the characteristic is designed as a stroke count of a lift rod of the machine tool or of the machining tool, a position, a velocity, and/or an acceleration of the lift rod or of the machining tool, or the like. It is also conceivable that the characteristic is designed as a time interval between two strokes of the lift rod or of the machining tool. Alternatively or additionally, it is conceivable that in order to identify a deflection or a breakdown by means of the analysis unit, a time derivative or an integral of a detected characteristic, in particular a time curve of the detected characteristic, is used, wherein, in particular, at least two values of the time derivative or of the integral of the detected characteristic, which are associated with a respective at least substantially identical value of the position characteristic, are compared to one another.

In addition, it is proposed that in at least one method step, the analysis unit uses at least one translation parameter of a transmission of the machine tool to determine the position characteristic. Advantageously simple and fast determination of the position characteristic from the detected magnetic field characteristic or current characteristic can be made possible. Preferably, further sensors for detecting the position characteristic can be omitted. As a result, advantageously low production and assembly costs of the machine tool, as well as advantageously simple retrofittability for older machine tools can be achieved. The term "translation parameter" should in particular be understood to mean a parameter of the transmission that describes a translation or conversion of a movement of the electric motor into the oscillating, in particular linearly oscillating, output movement by the transmission. In particular, the translation parameter is designed as a ratio of a rotation speed of the rotor of the electric motor and of an oscillation rate of the oscillating, in particular linearly oscillating, output movement driven by the electric motor. The translation parameter is in particular dependent on a design of the machine tool, in particular of the transmission, and is stored in the analysis unit. A number of specific signal curves of the magnetic field characteristic or of the current characteristic per period of the oscillating, in particular linearly oscillating, output movement $n_{Period}$ is preferably determined as a function of the translation parameter g and a number of specific signal curves of the magnetic field characteristic or of the current characteristic per complete revolution of the rotor $n_{Motor}$ via the equation $$n_{Period} = \frac{n_{Motor}}{g}.$$

In particular, via the number of specific signal curves of the magnetic field characteristic or of the current characteristic per period of the oscillating, in particular linearly oscillating, output movement, a detection time of any specific signal curve is determined, in particular in an order of the specific signal curves, within a period of the output movement, which detection time in particular represents a value of the position characteristic. For example, for each period of the output movement, a respective detection time of a first specific signal curve within a period of the output movement is determined by means of the analysis unit, wherein, by means of the analysis unit, a respective detected value of the physical characteristic is determined for each detection time of the first specific signal curve within a period, wherein each of the determined values of the physical characteristic is in particular used to identify a deflection or a breakdown. Preferably, the determined values of the physical characteristic are subtracted or divided by means of the analysis unit, wherein a difference or a quotient of the determined values of the physical characteristic is compared to a limit value, in particular the aforementioned limit value, in order to identify a deflection or a breakdown. In particular, a deflection or a breakdown is identified by means of the analysis unit when the limit value is exceeded by the difference or the quotient. For example, in particular if the characteristic is designed as a rotation speed of the motor, the limit value is between 500 rpm and 5000 rpm, preferably between 1000 rpm and rpm, and particularly preferably between 2000 rpm and 5000 rpm. Alternatively or additionally, it is conceivable that other specific signal curves and/or determined values of the characteristic, which can be associated with a detection time of other specific signal curves, can also be used for an identification of a deflection or of a breakdown by means of the analysis unit. For example, for each period of the output movement, at least one ratio of two determined values of the characteristic, which can be associated with a first specific signal curve and a second or another following specific signal curve, is determined, wherein, in particular for an identification of a deflection or of a breakdown, the ratios for at least two time-spaced, in particular, periods of the output movement are respectively compared to one another and a difference or quotient of these ratios is preferably compared to a limit value.

It is furthermore proposed that in at least one method step, the at least two values, which are detected at different times, of the characteristic are selected by means of the analysis unit in order to identify a deflection or a breakdown of the machine tool, in such a manner that a difference of detection times of the at least two values of the characteristic is more than one period, at least substantially exactly one period or one at least substantially integer multiple of a period of the oscillating, in particular linearly oscillating, output movement. Advantageously fast identification of a deflection or of a breakdown can be achieved, in particular since a change of the characteristic can be determined over a longer predetermined interval and delayed changes of the characteristic can thus be identified more quickly. Alternatively, in at least one method step, the at least two values, which are detected at different times, of the characteristic are selected by means of the analysis unit in order to identify a deflection or a breakdown of the machine tool, in such a manner that a difference of detection times of the at least two values of the characteristic is at least more than a time interval between two consecutive identical or different specific signal curves or more than a time interval of a complete revolution of the rotor. In particular, detected or determined values of the characteristic are stored by means of the analysis unit for each period of the oscillating, in particular linearly oscillating, output movement, for each time interval between two consecutive identical or different specific signal curves, or for each time interval of a complete revolution of the rotor. It is conceivable that the stored values of the characteristic will be deleted after a predetermined duration, for example after one minute or after a number of periods of the oscillating, in particular linearly oscillating, output movement or of complete revolutions of the rotor. Alternatively or additionally, it is conceivable that the stored values of the characteristic are stored in the machine tool and/or an external unit for an unlimited period of time.

Alternatively, a method for identifying a deflection or a breakdown of a machine tool, in particular a hand-held machine tool, with an oscillating, in particular linearly oscillating, output movement is assumed, wherein in at least one method step, by means of a detection unit, at least one physical characteristic of the machine tool, in particular of a motor, of a powertrain component, and/or of a machining tool of the machine tool is detected continuously or periodically, and wherein in a further method step, an analysis unit identifies a deflection or a breakdown as a function of at least two values of the characteristic, which were in particular detected at different times.

It is furthermore proposed that in at least one method step, the at least two values, which are detected at different times, of the characteristic are selected by means of the analysis unit in order to identify a deflection or a breakdown of the machine tool, in such a manner that a difference of detection times of the two values of the characteristic is greater than a time interval between two successively detected values of the characteristic. Preferably, the two values of the characteristic are not detected successively. In particular, at least another value of the characteristic is detected between the two values of the characteristic. Advantageously fast identification of a deflection or of a breakdown of the machine tool can preferably be enabled, in particular compared to a comparison of two directly consecutive values of the characteristic for identifying a deflection or a breakdown. Preferably, the physical characteristic is designed as a rotation speed of the motor, as a position of the rotor of the motor, which can in particular be determined via the magnetic field characteristic, as the current characteristic, as the magnetic field characteristic, and/or as a control signal of the control and/or regulating unit of the machine tool for commutating the motor. Particularly preferably, the characteristic is detected by means of the detection unit in time intervals that are each at most 20 ms, preferably at most 10 ms, and more preferably at most 5 ms. Preferably, the analysis unit uses at least substantially all detected values of the characteristic to identify a deflection or a breakdown of the machine tool. In particular, the analysis unit compares, in particular subtracts or divides, each detected value of the characteristic to at least one other previously detected value of the characteristic, wherein a comparison value, in particular a difference or a quotient, of these values is compared to the limit value in order to identify a deflection or a breakdown of the machine tool. Particularly preferably, the detected value and the other previously detected value of the characteristic are detected at different times, wherein, in particular, at least one time interval is between a detection time of the detected value of the characteristic and a detection time of the other previously detected value of the characteristic. Advantageously fast identification of a decrease of the characteristic, in particular of the motor rotation speed, can be achieved. As a result, advantageously fast identification of a deflection or of a breakdown of the machine tool can be achieved, in particular also at low motor rotation speeds.

Furthermore, it is proposed that in at least one method step, the analysis unit identifies a deflection or a breakdown of the machine tool as a function of a ratio of a vibration frequency and a vibration amplitude of a time curve of a rotation speed of a motor of the machine tool, which are determined at least as a function of the two values of the characteristic. Advantageously simple identification of a deflection or of a breakdown of the machine tool can be achieved, in particular since the identification can be carried out only via an analysis of the time curve of the rotation speed of the motor. Additional sensors can be omitted as a result. Advantageously, low production and assembly costs of the machine tool can thereby be achieved. Advantageously simple retrofittability of older machine tools can be achieved, since the identification can be made possible only via a detection and software-side analysis of the rotation speed of the motor. Preferably, the rotation speed of the motor of the machine tool, in particular the time curve of the rotation speed of the motor, is detected, in particular continuously or periodically, by means of the detection unit. Preferably, the vibration frequency and the vibration amplitude are determined by means of the analysis unit from the time curve of the rotation speed. In particular, the vibration frequency is determined by means of the analysis unit by a determination of a duration of a period of an oscillating vibration in the time curve of the rotation speed of the motor. In particular, when machining a workpiece or the like, the vibration frequency corresponds at least substantially to a stroke frequency of the machining tool and/or to a frequency of the oscillating, in particular linearly oscillating, output movement. The vibration frequency and the vibration amplitude of the time curve of the rotation speed is preferably determined by means of the analysis unit as a function of the at least two, in particular of a plurality of, values of the characteristic. Alternatively or additionally, it is conceivable that the vibration frequency is determined by means of the analysis unit via a fast Fourier transformation of the time curve of the rotation speed. In particular, the vibration frequency during an idle operation of the machine tool, wherein, in particular, the machine tool is operated at a distance from the workpiece, and during a breakdown or a deflection of the machine tool is greater than, in particular, at least substantially twice, the stroke frequency of the machining tool. Preferably, the vibration amplitude is less during an idle operation of the machine tool than during a machining operation and during a deflection or a breakdown of the machine tool. Alternatively or additionally, it is conceivable that the analysis unit identifies a deflection or a breakdown as a function of a signal difference of two values of the characteristic designed as a rotation speed, respectively over an entire period of the oscillating, in particular linearly oscillating, output movement, over half a period of the oscillating, in particular linearly oscillating, output movement and over a quarter period of the oscillating, in particular linearly oscillating, output movement. In particular, the signal differences are plotted over time and stored in the analysis unit. Preferably, the values of the characteristic are determined to determine the vibration frequency as a function of the position characteristic, which in particular associates a detection time of the values of the characteristic with a position within a period of the oscillating, in particular linearly oscillating, output movement. When identifying a deflection or a breakdown by means of the signal differences of the values of the characteristic over an entire period, half a period and a quarter period of the oscillating, in particular linearly oscillating, output movement, a respective limit value is preferably predetermined for each signal difference, wherein the signal differences over an entire period and half a period are at least substantially zero, and the signal difference over a quarter period at least substantially corresponds to a local maximum and/or local minimum of the time curve of the rotation speed difference over a quarter period. It is also conceivable that the analysis unit identifies a deflection or a breakdown as a function of a determined duration of the entire period, half the period and/or the quarter period of the oscillating, in particular linearly oscillating, output movement, in particular via a comparison to a previously determined duration of a corresponding period length.

In addition, it is proposed that in at least one method step, a shape and/or a type of an electronic control signal to be output is specified by means of an operator interface, wherein in at least one further method step, the electronic control signal is output by means of the analysis unit upon identification of a deflection or of a breakdown of the machine tool. Advantageously, a response of the machine tool to an identification of a deflection or of a breakdown of the machine tool can be adjusted in an application-specific and/or user-specific manner. As a result, an advantageously high user-friendliness and an advantageously high flexibility can be made possible. For example, by means of the operator interface, the response of the machine tool to an identification of a deflection or of a breakdown of the machine tool is adjusted as a function of a workpiece to be machined or of a machining location of the machine tool. In particular, the shape and/or type of the electronic control signal to be output determines a response of the machine tool to the identification of the deflection or of the breakdown. Preferably, by adjusting the shape and/or type of the electronic control signal via the operator interface, a response of the machine tool to the identification of the deflection or of the breakdown is specified. Preferably, the analysis unit comprises a plurality of different electronic control signals, which differ in particular in shape and/or type, wherein in at least one method step, an electronic control signal to be output via the analysis unit upon identification of a deflection or of a breakdown is selected by means of the operator interface.

In addition, a device is proposed for performing a method according to the disclosure for identifying a deflection or a breakdown of a machine tool, in particular a hand-held machine tool, with an oscillating, in particular linearly oscillating, output movement, by means of at least one, in particular the aforementioned, detection unit and by means of at least one, in particular the aforementioned, analysis unit.

Preferably, the device, in particular the detection unit and the analysis unit, is designed as part of the machine tool and is in particular arranged within or on a housing of the machine tool. The detection unit is preferably provided to detect the physical characteristic and/or the position characteristic. The term "provided" should in particular be understood to mean specially programmed, specially designed, and/or specially equipped. An object, in particular the detection unit, being provided for a particular function should in particular be understood to mean that the object fulfills and/or performs this particular function in at least one application state and/or operating state. It is also conceivable that the analysis unit is provided for determining the position characteristic from a characteristic detected by means of the detection unit. The detection unit comprises at least one sensor element for detecting the characteristic. In a preferred embodiment, the detection device comprises at least one Hall probe arranged on the motor of the machine tool or designed as part of the motor. Preferably, the Hall probe is provided to detect the magnetic field characteristic of the motor. In particular, the Hall probe is provided to detect a variable magnetic field generated via a movement of the magnet attached to the rotor. In particular, the Hall probe is provided to output an electric voltage, in particular as a function of the magnetic field in a close range of the Hall probe. Preferably, the Hall probe is provided for a continuous detection of the magnetic field characteristic, wherein, in particular, a time curve of the electric voltage is output. In an alternative embodiment, the detection unit comprises at least one sensor element for detecting the current characteristic of the electric motor. Particularly preferably, the detection unit comprises at least one, in particular a further, sensor element for detecting a rotation speed of the motor. Preferably, the detection unit comprises at least one, in particular a further or different, sensor element for detecting a location of the machine tool in space and/or an orientation of the machine tool in space, e.g., a gyroscope, a sensor as part of a positioning system, a radio system, or the like. Particularly preferably, the analysis unit is provided for adjusting the limit value for identifying a deflection or a breakdown, as a function of a position detected by means of the detection unit, a location and/or a rotation speed. It is conceivable that the limit value is adjusted by means of a neural network implemented at least in part via the analysis unit or the control and/or regulating unit. The term "neural network" should in particular be understood to mean a network consisting of a plurality of computing units, in particular analysis units and/or control and/or regulating units of a plurality machine tools connected to one another, in particular by information technology, at least intermittently, which machine tool are connect to one another for a computing function, such as for calculations or for an analysis of data, wherein, in particular, a result of the computing function within the network is stored on all devices forming the network and/or is transmitted to all devices forming the network. In particular, by means of the neural network, in particular all signals and/or data detected via the detection unit are merged and analyzed, preferably using a machine learning method. The term "machine learning method" should in particular be understood to mean a method that is performed or can be performed by a computing unit, in particular the analysis unit and/or the control and/or regulating unit, wherein the computing unit analyzes detected or predetermined data, such as historically detected operations during a deflection or a breakdown, and adjusts a procedure or algorithm for future applications or situations as a function of an analysis of the data. In particular, the neural network is provided to analyze, in particular by means of the machine learning method, past operations for identifying a deflection or a breakdown with regard to a correctness, for example entered by the user, of an identification and to adjust an algorithm applied via the analysis unit for identifying a deflection or a breakdown and/or the limit value for future operations. For example, the analysis unit is provided to increase the limit value during work with the machine tool above the head, which is in particular detected via the detection unit, relative to work in a hip position, for example, in particular since a lighter hold by the user can generally be assumed during work above the head.

Preferably, the sensor element, in particular one, a further or different sensor element, of the detection unit is provided for detecting an acceleration of the machine tool in space. Particularly preferably, the Hall probe or a different sensor element of the detection unit is provided for detecting a magnetic field of the electric motor in space.

Preferably, the analysis unit is provided to analyze the detected characteristic and/or the position characteristic. Particularly preferably, the analysis unit is provided for identifying a deflection or a breakdown of the machine tool, in particular as a function of the two values of the characteristic and the position characteristic. The term "analysis unit" should in particular be understood to mean a unit comprising at least one analysis electronics provided to analyze electrical and/or electronic data. Preferably, the analysis unit comprises at least one algorithm or one electronic learning method for processing electrical and/or electronic data, wherein the algorithm or the electronic learning method is provided to identify a deflection or a breakdown of the machine tool as a function of data transmitted to the analysis unit. The term "analysis electronics" should in particular be understood to mean a unit comprising a processor unit and comprising a memory unit as well as an operating program stored in the memory unit. Preferably, the processor unit is designed as a processor, as an FPGA, as a microcontroller or the like.

The motor of the machine tool is preferably designed as an electric motor, in particular a brushless electric motor, and particularly preferably as a brushless DC motor. The motor preferably has a linear or rotating drive movement, wherein the drive movement drives the oscillating, in particular linearly oscillating, output movement. The machine tool, in particular the motor, preferably comprises at least one transmission for force transmission between the drive movement and the output movement and/or a movement of the machining tool. Preferably, the transmission of the machine tool has the translation parameter and/or is designed in such a way that a transmission and/or translation of a movement from the motor to the machining tool takes place according to the translation parameter. In particular, in a preferred embodiment, the machine tool is provided to drive the machining tool with a pendulum stroke. For example, the machine tool comprises an oscillating drive, in particular in order to realize the oscillating, in particular linearly oscillating, output movement. For example, the machine tool comprises a lift rod for outputting the movement via the machining tool. For example, the machine tool is designed as a saber saw, as an OMT (oscillation multitool), as a jigsaw, as an electric handsaw, or the like. The machine tool comprises at least one, in particular the aforementioned, control and/or regulating unit for controlling and/or regulating the motor, the detection unit, the operator interface, the output unit, and/or the analysis unit. The term "control and/or regulating unit" should in particular be understood to mean a unit comprising at least one control electronics. The term "control electronics" should in particular be understood to mean a unit comprising a processor unit and comprising a memory unit as well as an operating program stored in the memory unit. It is conceivable that the control and/or regulating unit and the analysis unit are designed integrally, wherein, in particular, the control and/or regulating unit and the analysis unit are arranged together on a common electronic circuit board and/or are, for example, designed together via a processor unit as a processor, as an FPGA, as a microcontroller, or the like. Particularly preferably, the control and/or regulating unit is provided for controlling and/or regulating at least the motor as a function of the control signal, in particular output via the analysis unit, in particular upon identification of a deflection or of a breakdown by means of the analysis unit. In particular, the machine tool comprises the output unit. Preferably, the output unit is provided to output at least one haptic, acoustic and/or visual signal, in particular as a function of the control signal, e.g., in order to warn the user of the machine tool and/or other persons in a vicinity of the machine tool. For example, the output unit is designed as a display, as an LED, as a lamp, as a vibration generator, as an actuator, in particular for moving at least one component of the machine tool, as a speaker, or the like. It is also conceivable that the control and/or regulating unit is provided for controlling at least one actuator of the machine tool to move, in particular extend, raise, or the like, a protective element, as a function of the control signal, in particular upon identification of a deflection or of a breakdown. In particular, the protective element is provided to protect the user from injuries in the event of a deflection or a breakdown. For example, the protective element is designed as a protection lever, as a blocking of the machining tool, as a cover, or the like.

As a result of the embodiment of the device according to the disclosure, an advantageously high degree of user safety can be achieved when using the machine tool, in particular since advantageously fast identification of a deflection or of a breakdown of the machine tool can be made possible.

It is also proposed that the detection unit is provided to detect at least one value of a position characteristic, designed as a position, velocity and/or acceleration, of the oscillating, in particular linearly oscillating, output movement of the machine tool at least substantially directly on a machining tool and/or an output element of the machine tool, wherein the at least one value of the position characteristic repeats periodically, in particular exactly once, during the output movement. Advantageously direct and simple detection of the position characteristic can be made possible. Computing-intensive analyses for determining the position characteristic can be omitted. As a result, an advantageously simple and cost-efficient embodiment of the analysis unit can be made possible. The term "substantially directly" should in particular be understood to mean that the position characteristic is detected by means of the detection unit via a measurement of a property, in particular a position, a velocity and/or an acceleration, of the machining tool. Preferably, the detection unit comprises at least one sensor element for detecting the position characteristic. In particular, the sensor element is arranged on the machining tool or in a close range of the machining tool. The term "close range" should in particular be understood to mean an area of an object, in particular of the machining tool, which extends around the object within at most 5 cm, preferably at most 3 cm, and more preferably at most 2 cm. Preferably, the sensor element, in particular one, a further or different sensor element, of the detection unit is provided for detecting the position characteristic, designed as a position, velocity and/or acceleration, of the oscillating, in particular linearly oscillating, output movement of the machine tool at least substantially directly on the machining tool. For example, the sensor element is designed as a camera, in particular with an image analysis, as a laser barrier or the like, in particular for detecting a passage of a reference point, as an acceleration sensor, in particular a gyroscope, a piezoelectric acceleration sensor or the like, as a contact counter or as a different sensor element known to a person skilled in the art. It is also conceivable that the detection unit, in particular the sensor element, is provided to detect the physical characteristic for identifying a deflection or a breakdown at least substantially directly on the machining tool, for example, via a detection of an abrupt change in the position, the velocity and/or the acceleration of the machining tool and/or a change of a usual time curve of the detected position, velocity and/or acceleration, in particular as a function of the position characteristic. Preferably, the output element is designed as an element transmitting the output movement from the transmission or the motor to the machining tool, such as a lift rod.

In addition, a machine tool, in particular a hand-held machine tool, is proposed with an oscillating, in particular linearly oscillating, output movement and comprising a device according to the disclosure. Preferably, the device is designed as part of the machine tool or is arranged within or on the machine tool.

As a result of the embodiment of the machine tool according to the disclosure, an advantageously high degree of user safety can be achieved, in particular since advantageously fast identification of a deflection or of a breakdown of the machine tool can be made possible.

The method according to the disclosure, the device according to the disclosure and/or the machine tool according to the disclosure is/are not to be limited to the application and embodiment described above. In order to fulfill a functionality described herein, the method according to the disclosure and/or the device according to the disclosure and/or the machine tool according to the disclosure can in particular comprise a number of individual elements, components, units, and method steps that deviates from a number mentioned herein. Moreover, in the case of the value ranges specified in this disclosure, values within the mentioned limits are also to be considered as disclosed and usable as desired.

BRIEF DESCRIPTION OF THE DRAWINGS

Further advantages become apparent from the following description of the drawing. Four exemplary embodiments of the disclosure are illustrated in the drawings. The drawings, the description and the claims contain numerous features in combination. A person skilled in the art will expediently also consider the features individually and combine them to form meaningful further combinations.

Shown are.

DETAILED DESCRIPTION

Figure 1:
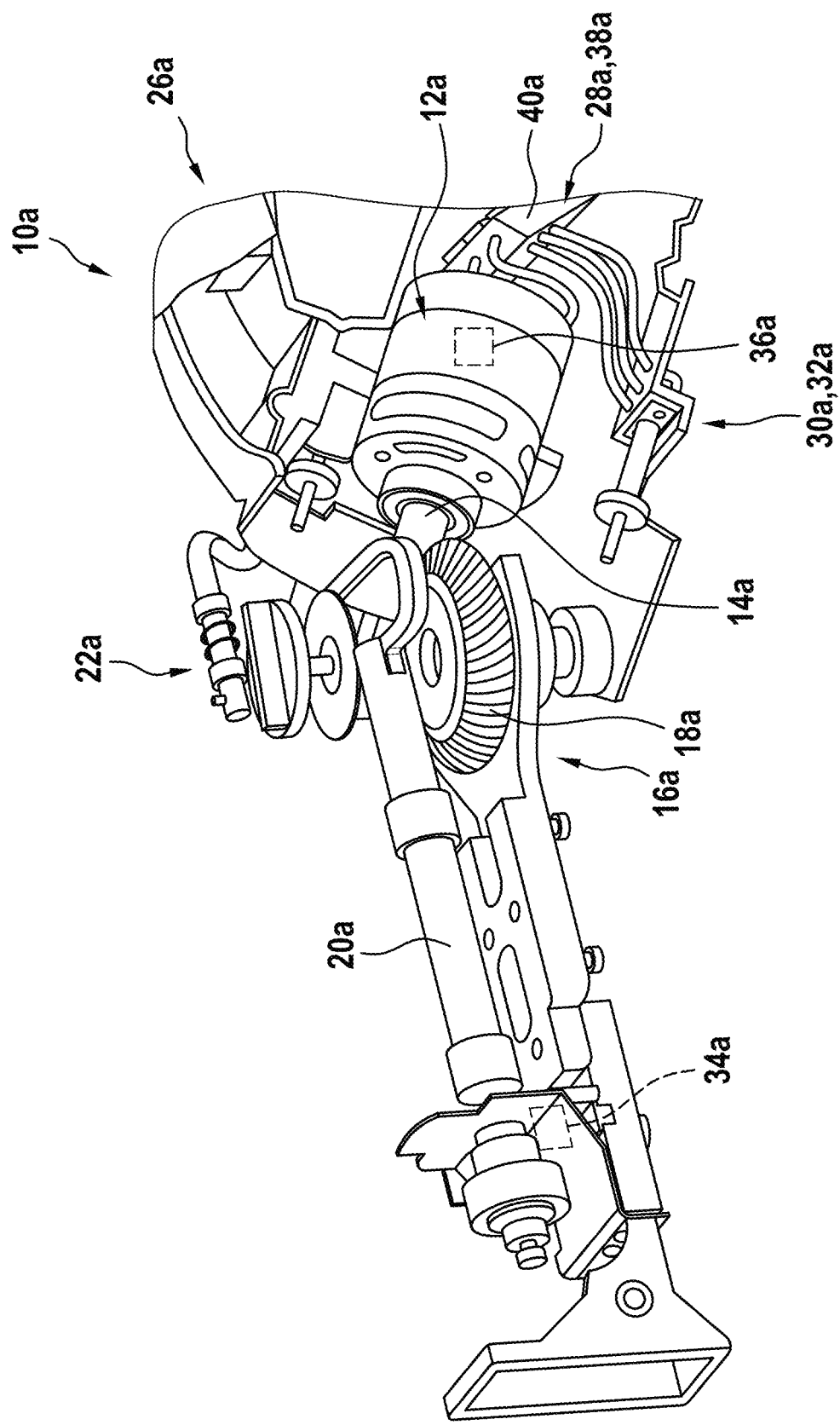
FIG. 1 a schematic representation of a machine tool according to the disclosure with a device according to the disclosure for performing a method according to the disclosure for identifying a deflection or a breakdown of the machine tool, FIG. 2 an exemplary measurement of a time curve of a rotation speed of a motor of the machine tool according to the disclosure, FIG. 3 an exemplary measurement of a time curve of a rotation speed of a motor of the machine tool according to the disclosure during a deflection of the machine tool, FIG. 4 a schematic representation of an exemplary sequence of the method according to the disclosure for identifying a deflection or a breakdown of the machine tool according to the disclosure, FIG. 5 a schematic representation of an alternative embodiment of a machine tool according to the disclosure with a device according to the disclosure for performing a method according to the disclosure for identifying a deflection or a breakdown of the machine tool, FIG. 6 an exemplary measurement of a time curve of a magnetic field characteristic of an electric motor of the machine tool according to the disclosure, FIG. 7 a schematic representation of an exemplary sequence of an alternative embodiment of the method according to the disclosure for identifying a deflection or a breakdown of the machine tool according to the disclosure, FIG. 8 an exemplary measurement of time curves of a rotation speed of a motor of the machine tool according to the disclosure, of a determined ratio for identifying a deflection or a breakdown of the machine tool according to the disclosure, and of an output control signal during a deflection of the machine tool, FIG. 9 exemplary measurements of a time curve of a rotation speed of a motor of the machine tool according to the disclosure in an idle operation, during a deflection of the machine tool, and during a machining operation on a workpiece, FIG. 10 an exemplary measurement of a time curve of a rotation speed of a motor of the machine tool according to the disclosure during a deflection of the machine tool with a plurality of detection intervals of a detection unit of a device according to the disclosure for identifying a deflection or a breakdown of the machine tool, and FIG. 11 a schematic representation of an exemplary sequence of a further alternative embodiment of the method according to the disclosure for identifying a deflection or a breakdown of the machine tool according to the disclosure.

FIG. 1 shows a machine tool 10a designed as an electric hand-held machine tool, in particular as a saber saw. The machine tool 10a comprises an electric motor 12a, which is designed as a brushless DC motor. The electric motor 12a is provided to rotate a rotor of the electric motor 12a (not shown in FIG. 1) via a suitable commutation. Via the rotation of the rotor, a drive shaft 14a of the electric motor 12a rotates. The machine tool 10a comprises a transmission 16a. Preferably, the electric motor 12a, together with the transmission 16a, is designed as an oscillating drive. The transmission 16a comprises a gear wheel 18a that is provided to convert a rotation of the drive shaft 14a into a stroke movement of a lift rod 20a of the machine tool 10a. In particular, the lift rod 20a put into linearly oscillating output movement via a rotation of the gear wheel 18a. A machining tool of the machine tool 10a, which is in particular not shown in FIG. 1, is attached to the lift rod 20a and is reciprocated along an at least substantially straight path via the stroke movement. The machining tool of the machine tool 10a is preferably designed as a saw blade. However, other embodiments of the machine tool 10a, in particular of the electric motor 12a of the machine tool 10a, of the transmission 16a, of the output movement, and/or of the machining tool, are also conceivable. For example, an embodiment of the motor 12a of the machine tool 10a that is different from an electric motor or a brushless DC motor is conceivable. In particular, an embodiment of the machine tool 10a that is different from a saber saw is conceivable, for example an OMT, a jigsaw, or the like. For example, an oscillating, in particular non-linearly oscillating, output movement of the machine tool 10a is conceivable, for example a pendulum-like oscillating output movement of an OMT.

The machine tool 10a comprises a device 22a for performing a method 24a (see FIG. 4) for identifying a deflection or a breakdown of the machine tool 10a. The device 22a comprises a detection unit 26a for detecting a physical characteristic of the machine tool 10a, in particular of the motor 12a, of a powertrain component and/or of the machining tool of the machine tool 10a, and an analysis unit 28a for identifying a deflection or a breakdown of the machine tool 10a as a function of at least two values, which are detected at different times, of the characteristic of the machine tool 10a, wherein the at least two values of the characteristic are associated with a respective at least substantially identical value of a discrete position characteristic of the oscillating, in particular linearly oscillating, output movement of the machine tool 10a. The device 22a comprises an operator interface 30a, which is provided at least for setting a shape and/or type of an electronic control signal to be output via the analysis unit 28a upon identification of a deflection or of a breakdown. Preferably, the operator interface 30a is provided to select, from a plurality of different predetermined control signals, a shape and/or type of the electronic control signal to be output via the analysis unit 28a upon identification of a deflection or of a breakdown. In particular, the operator interface 30a is designed as a rotary switch and is in particular not shown in detail in FIG. 1. However, other embodiments of the operator interface 30a are also conceivable, for example, as a toggle switch, as a control panel, as a touch display, and/or as part of a control unit of the machine tool 10a. The machine tool 10a comprises an output unit 32a designed as a speaker. The analysis unit 28a is provided to drive the output unit 32a when the control signal is output. Preferably, the output unit 32a is provided to output, in particular upon identification of a deflection or of a breakdown by the analysis unit 28a, at least one acoustic signal, in particular a signal tone, as a function of the control signal, preferably in order to warn a user of the machine tool 10a and/or other persons in a vicinity of the machine tool 10a. However, other embodiments of the output unit 32a are also conceivable, e.g., as an LED, as a display for outputting a visual signal and/or as a vibration generator for outputting a haptic signal.

The detection unit 26a comprises at least one sensor element 36a arranged on the electric motor 12a and provided for detecting the physical characteristic designed as the rotation speed of the electric motor 12a. The sensor element 36a is designed as an inductive pulse generator and is in particular provided to detect the movement of the rotor and, via it, output the rotation speed. However, other embodiments of the sensor element 36a are also conceivable for detecting the characteristic designed as the rotation speed of the electric motor 12a, wherein the sensor element 36a is, for example, designed as a camera, as a Hall probe for detecting a magnetic field characteristic of the rotating electric motor 12a, as an amperemeter for detecting a periodic control current of the electric motor 12a, or the like. The detection unit 26a is provided to detect at least one value of the position characteristic, designed as a position, velocity and/or acceleration, of the linearly oscillating output movement of the machine tool 10a at least substantially directly on a machining tool and/or an output element of the machine tool 10a, wherein the at least one value of the position characteristic repeats periodically exactly once during the output movement, in particular within a period of the linearly oscillating output movement. The detection unit 26a comprises a further sensor element 34a, in particular for detecting the position characteristic of the output movement designed as a velocity, in particular a velocity vector, of the lift rod 20a. In this case, in the oscillating reciprocating movement of the lift rod 20a, each value of the position characteristic that is in particular different from zero, is detected exactly once for each period of the output movement, in particular when considering a magnitude and a direction of the velocity of the lift rod. The further sensor element 34a is arranged in a close range of the lift rod 20a. The further sensor element 34a is designed as a velocity sensor, in particular as an optical sensor, as a contact sensor, as a magnetic sensor, such as a Hall sensor, a reed sensor, or the like, for detecting a magnetic field variable by the velocity of the lift rod, as an AMR sensor, as a GMR sensor, or the like.

The analysis unit 28a is designed as part of a control and/or regulating unit 38a of the machine tool 10a. The control and/or regulating unit 38a is provided for controlling and/or regulating the electric motor 12a, the detection unit 26a, the operator interface 30a, and the output unit 32a. The control and/or regulating unit 38a and the analysis unit 28a comprise an electronic circuit board 40a on which a processor unit (not shown in FIG. 1) and a memory unit (not shown in FIG. 1) designed as an electronic data storage device are arranged. In particular, the processor unit is provided to perform an algorithm stored in the memory unit for identifying a deflection or a breakdown of the machine tool 10a as a function of the detected characteristic and of the detected position characteristic. Particularly preferably, the control and/or regulating unit 38a is provided for controlling and/or regulating at least the electric motor 12a via the control signal, in particular upon identification of a deflection or of a breakdown of the machine tool 10a. It is also conceivable that the control and/or regulating unit 38a is provided for controlling at least one actuator of the machine tool 10a to move, in particular extend, raise, or the like, a protective element (not shown in FIG. 1), as a function of the control signal, in particular upon identification of a deflection or of a breakdown of the machine tool 10a. In particular, the protective element is provided to protect the user from injuries in the event of a deflection or a breakdown. For example, the protective element is designed as a protection lever, as a blocking of the machining tool, as a cover, or the like. Other embodiments of the analysis unit 28a are also conceivable, wherein the analysis unit 28a is, for example, formed/arranged separately and/or spaced apart from the control and/or regulating unit 38a. In particular, the analysis unit 28a is provided to output, in particular to transmit, the control signal to the control and/or regulating unit 38a upon identification of a deflection or of a breakdown of the machine tool.

Figure 2:
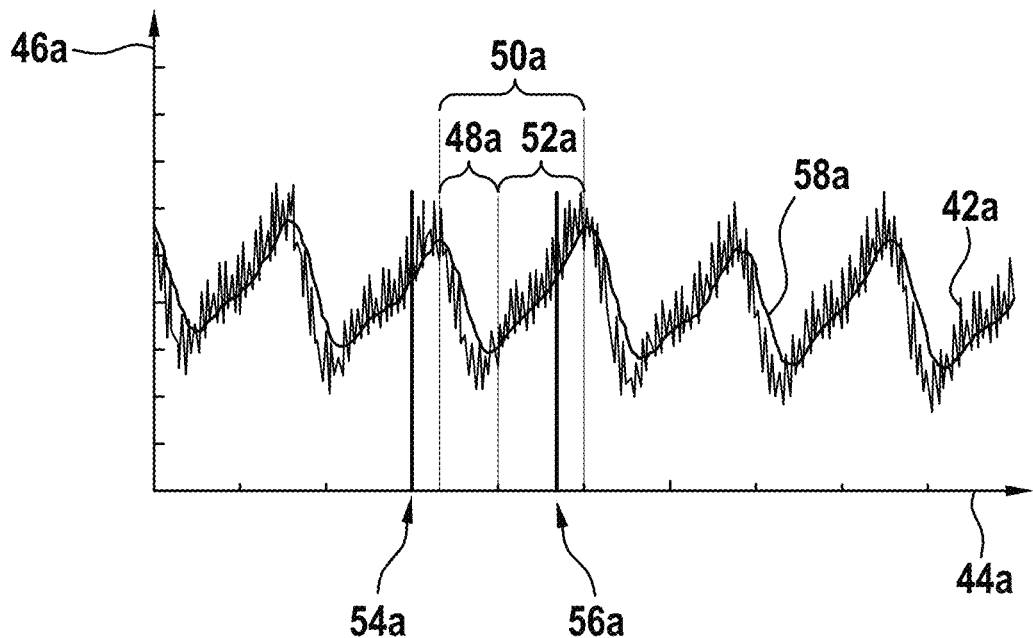

FIG. 2 shows an exemplary time curve 42a, detected by means of the detection unit 26a, in particular the sensor element 36a, of the characteristic designed as the rotation speed of the electric motor 12a during a sawing operation of the machine tool 10a. Due to the linearly oscillating output movement and a force transmission, changing with the direction of the stroke movement, between the machining tool arranged on the lifting rod 20a and a workpiece, the time curve 42a of the characteristic has a periodically changing, in particular oscillating, shape, which in particular differs from a sine or cosine function. An abscissa 44a of the graph shown in FIG. 2 indicates the time. An ordinate 46a indicates the rotation speed of the electric motor 12a. In a first portion 48a of a period 50a of the linearly oscillating output movement in the time curve 42a of the characteristic, a return stroke movement of the lift rod 20a takes place, wherein the lift rod 20a in particular moves toward the electric motor 12a. In a second portion 52a of a period 50a of the linearly oscillating output movement in the time curve 42a of the characteristic, a forward stroke movement of the lift rod 20a takes place, wherein the lift rod 20a in particular moves away from the electric motor 12a. At two time points 54a, 56a, the lift rod 20a has a respective substantially identical value of the position characteristic designed as the velocity of the lift rod, wherein the lift rod 20a moves away from the electric motor 12a, particularly at both time points 54a, 56a, at the same speed. The analysis unit 28a is provided for associating values of the characteristic as a function of a detection time of the values with a respective value of the position characteristic or associating values of the position characteristic as a function of a detection time of the values with a respective value of the characteristic. Particularly preferably, values of the characteristic and of the position characteristic that have a detection time that is at least substantially identical are respectively associated with one another. For example, the analysis unit 28a respectively selects a detected value of the parameter and associates it with a value of the position characteristic that in particular has a detection time that is closest to a detection time of the selected value of the characteristic. The analysis unit 28a is provided to compare two values of the characteristic designed as the rotation speed, in particular the values of the time curve 42a of the characteristic at the two time points 54a, 56a that have a respective substantially identical associated value of the position characteristic, to one another via a subtraction or a division in order to identify a deflection or a breakdown. The analysis unit 28a is provided to identify a deflection or a breakdown of the machine tool 10a if a determined difference or a determined quotient of the two values exceeds a limit value stored in the analysis unit 28a, in particular the memory unit. Preferably, the analysis unit 28a is provided to output the control signal when the limit value is exceeded by the determined difference or the determined quotient of the two values of the characteristic and/or when the deflection or the breakdown of the machine tool 10a is identified, wherein, in particular, the electric motor 12a is decelerated or deactivated via the control and/or regulating unit 38a, or a rotation speed of the electric motor 12a is set. For example, in particular after the analysis unit 28a identifies a breakdown or a deflection, the electric motor 12a is switched off, decelerated or disconnected and/or uncoupled from the transmission 16a, a motor current for driving the electric motor 12a is briefly and/or abruptly increased, in particular to break loose the machining tool in the event of a jamming on the workpiece, and/or a motor current for driving the electric motor 12a is briefly and/or abruptly decreased by means of the control and/or regulating unit 38a via the control signal. Preferably, the control and/or regulating unit 38a and/or the analysis unit 28a are/is provided for returning the electric motor 12a to a normal operating mode if the user has control of the machine tool 10a again and/or has released the machine tool, in particular the machining tool, from the workpiece, which can preferably be detected via the characteristic and/or the position characteristic by means of the control and/or regulating unit 38a and/or the analysis unit 28a.

It is conceivable that the detected characteristic or the time curve 42a of the detected characteristic is filtered electrically and/or electronically, in particular in order to remove and/or reduce noise, by means of the detection unit 26a and/or the analysis unit 28a, in particular prior to an analysis of a deflection or a breakdown of the machine tool 10a by the analysis unit 28a. Such a filtered time curve 58a of the detected characteristic is shown in FIG. 2. Preferably, the two values of the characteristic that are used by means of the analysis unit 28a to identify a deflection or a breakdown are taken from the filtered time curve 58a of the characteristic.

Figure 3:
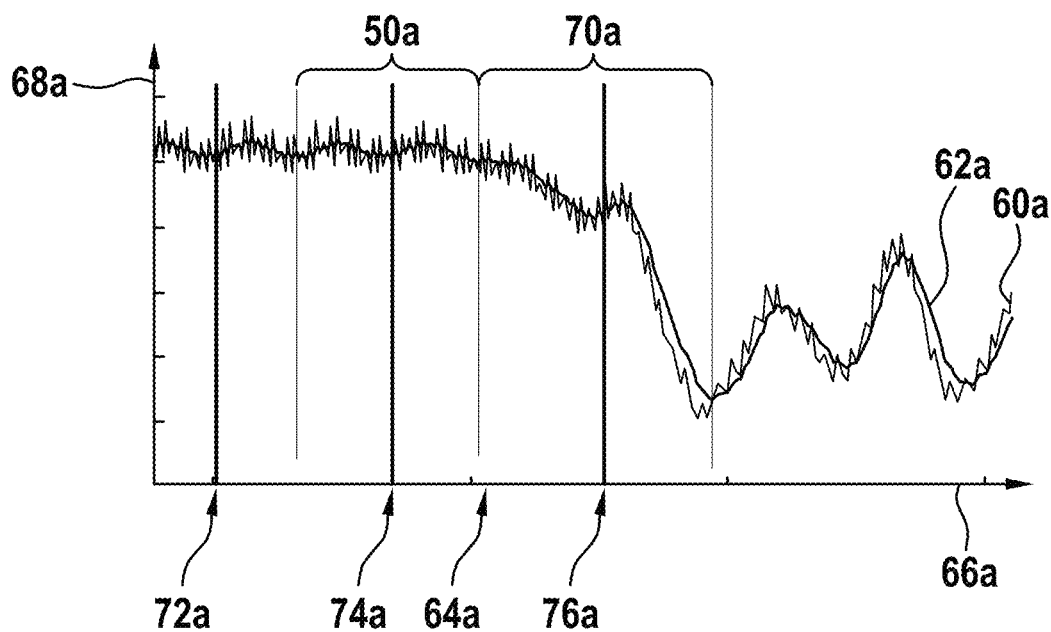

FIG. 3 shows a further exemplary detected time curve 60a, detected by means of the detection unit 26a, in particular the sensor element 36a, of the characteristic designed as the rotation speed of the electric motor 12a as well as a filtered time curve 62a of the characteristic that was measured during an idle operation of the machine tool 10a, wherein a deflection of the machine tool 10a takes place at a time point 64a. An abscissa 66a of the graph shown in FIG. 3 indicates the time. An ordinate 68a indicates the rotation speed of the electric motor 12a. In particular, in a portion prior to the deflection, the time curve 60a of the characteristic has an at least substantially sinusoidal shape since the machining tool does not interact with a workpiece during idle operation. After the deflection, the rotation speed of the electric motor 12a decreases sharply as a result of the spontaneous interaction with a workpiece, wherein, in particular, a decrease in the rotation speed to a minimum lasts for at least one period 50a, 70a of the output movement. At time points 72a, 74a, 76a, the analysis unit 28a respectively compares values of the characteristic to one another in order to identify a deflection or a breakdown of the machine tool 10a. At time point 76a, a difference or quotient of a value of the characteristic detected at time point 76a and another value of the characteristic detected at the time point 74a prior to the time point 76a exceeds the limit value, wherein the control signal to decelerate the electric motor 12a is output via the analysis unit 28a. In particular, the deflection increases a period 70a of the time curve 60a of the characteristic compared to a period 50a prior to the deflection. Preferably, this effect is compensated by taking into account the position characteristic when selecting the values of the characteristic used to identify the deflection.

Figure 4:
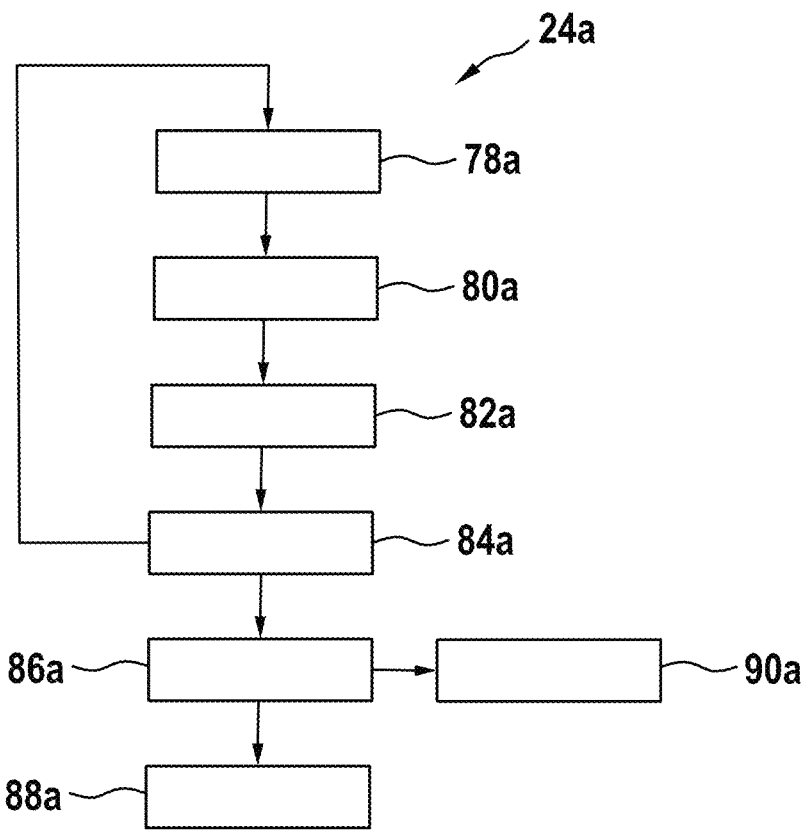

FIG. 4 shows an exemplary sequence of the method 24a for identifying a deflection or a breakdown of the machine tool 10a with the linearly oscillating output movement. Preferably, the sequence shown of method steps 78a, 80a, 82a, 84a, 86a corresponds to the algorithm performed via the analysis unit 28a in order to identify a deflection or a breakdown of the machine tool 10a. Preferably, the algorithm is performed repeatedly, in particular at least until a deflection or a breakdown of the machine tool 10a is identified. In a method step 78a of the method 24a, the physical characteristic of the machine tool 10a, in particular of the electric motor 12a, is continuously detected by means of the detection unit 26a. Preferably, the physical characteristic is detected by means of the detection unit 26a in operating states of the machine tool 10a in which the machining tool is moved. Preferably, the physical characteristic is detected by means of the detection unit 26a at a frequency of at least 50 Hz, preferably at least 100 Hz, more preferably at least 200 Hz, and particularly preferably at least 750 Hz, wherein the frequency in particular indicates a number of values of the characteristic detected within a second.

In a further method step 80a of the method 24a, at least one value of the position characteristic is respectively associated with detected values of the characteristic by means of the analysis unit 28a as a function of a detection time of the individual values. Preferably, exactly one value of the position characteristic is respectively associated with specific or all detected values of the characteristic by means of the analysis unit 28a. Preferably, the characteristic is at least substantially continuously detected by means of the detection unit 26a, in particular independently of the position characteristic, wherein at least two values of the characteristic are preferably respectively selected for a predetermined value of the position characteristic in order to identify a deflection or a breakdown. Particularly preferably, one value of the characteristic and one value of the position characteristic associated with the value of the characteristic respectively have a detection time that is at least substantially identical. In particular, a value of the characteristic associated with a value of the position characteristic comprises a detection time, which is closer to a detection time of the value of the position characteristic with which the value of the characteristic is associated than all other detected values of the characteristic. In particular, for a number of values of the position characteristic that is less within a time interval, in particular a period of output movement, than a number of values of the characteristic, it is conceivable that a respective value of the position characteristic is associated only with specific detected values of the characteristic, wherein the values of the characteristic are in particular selected that have an at least substantially identical detection time as a value of the position characteristic or that have a detection time that is closer to a detection time of a value of the position characteristic than all other detected values of the characteristic. It is also conceivable that the characteristic, in particular values of the characteristic, is respectively detected by means of the detection unit 26a only for particular predetermined values of the position characteristic. It is in particular conceivable that the characteristic is respectively detected by means of the detection unit 26a only at detection times with which a particular predetermined value of the position characteristic is associated.

Preferably, in a further method step 82a of the method 24a, in particular prior to an analysis of the characteristic, a detected time curve of the physical characteristic is filtered, in particular to reduce noise effects, by means of the analysis unit 28a or the detection unit 26a in order to identify a deflection or a breakdown by the analysis unit 28a. It is also conceivable that individual values of the physical characteristic are respectively filtered with regard to noise effects, for example by comparison with a noise limit value of the characteristic and/or respectively other values of the physical characteristic, with which is preferably associated a respective identical or similar value of the position characteristic as with the respective individual value. In a further method step 84a of the method 24a, a deflection or a breakdown of the machine tool 10a is identified by means of an analysis unit 28a as a function of at least two values, which are detected at different times, of the characteristic of the machine tool 10a, wherein the at least two values of the characteristic are associated with a respective at least substantially identical value of the discrete position characteristic of the linearly oscillating output movement of the machine tool 10a. Preferably, in order to identify a breakdown or a deflection, the detected values of the characteristic are respectively selected by means of the analysis unit 28a as a function of a value of the position characteristic associated with the individual values of the characteristic. In a method step of the method 24a, in particular the method step 84a, the analysis unit 28a determines a difference or a quotient of the at least two values, which are detected at different times, of the characteristic and compares it to the limit value in order to identify a deflection or a breakdown of the machine tool 10a. Preferably, the two values, which are detected at different times, of the characteristic are detected in different periods of the linearly oscillating output movement. Preferably, in a method step of the method 24a, in particular the method step 84a, in order to identify a deflection or a breakdown, a change of the physical characteristic, in particular of the time curve of the characteristic, is determined relative to a last detection time of the characteristic, at which an at least substantially identical value of the position characteristic was associated with the characteristic as at an instantaneous detection time, in particular, of a value of the characteristic used to determine the change. Preferably, in a method step of the method 24a, in particular the method step 84a, the deflection or the breakdown is identified by means of the analysis unit 28a as a function of the two detected values of the characteristic that were respectively detected at a time at which the machining tool has an at least substantially identical position and/or the output movement of the machine tool 10a has an at least identical magnitude of the position characteristic. Particularly preferably, a deflection or a breakdown is identified by means of the detection unit 26a and/or the analysis unit 28a within at most 100 ms, preferably at most 40 ms, and more preferably at most 20 ms. Particularly preferably, a deflection or a breakdown is identified by means of the detection unit 26a and/or the analysis unit 28a within at most two strokes/periods of the output movement, and most preferably within at most one stroke/period of the output movement. It is conceivable that in a method step of the method 24a, in particular the method step 84a, the two values, which are detected at different times, of the characteristic, in particular the value and the other value, are selected by means of the analysis unit 28a in order to identify a deflection or a breakdown of the machine tool 10a, in such a manner that a difference of detection times of the at least two values of the characteristic is more than one period, at least substantially exactly one period or one at least substantially integer multiple of a period of the oscillating, in particular linearly oscillating, output movement. It is conceivable that more than one limit value for identifying a deflection or a breakdown of the machine tool 10a is stored in the analysis unit 28a and/or in a memory unit. In is conceivable that in at least one method step of the method 24a, e.g., the method step 82a, as a function of an operating state of the machine tool 10a, of a spatial location of the machine tool 10a, of a machining movement of the machine tool 10a by a user, of a type of a workpiece to be machined, or the like, the analysis unit 28a selects at least one stored limit value for comparison with the difference or the quotient.

In a further method step 86a of the method 24a, upon identification of a deflection or of a breakdown of the machine tool 10a by means of the analysis unit 28a, the electronic control signal is output. It is conceivable that the analysis unit 28a makes a distinction between a deflection and a breakdown, wherein for a deflection, a different electrical and/or electronic control signal and/or a control signal with a different shape and/or a different type is in particular output than for a breakdown. In order to distinguish between a deflection and a breakdown, the analysis unit 28a uses, for example, a magnitude of the difference or of the quotient that exceeds the limit value, wherein in particular in the case of a deflection, a higher value is determined for the magnitude that exceeds the limit value. It is also conceivable that in order to distinguish between a deflection and a breakdown, the analysis unit 28a analyzes a movement of the machine tool 10a and/or of the machining tool. In particular, during a deflection, the machine tool 10a, the lift rod 20a and/or the machining tool is accelerated in a different direction relative to a previous machining movement than during a breakdown. In particular, at least one function of the machine tool 10a and/or of the electric motor 12a is controlled by means of the electrical and/or electronic control signal. For example, by means of the electrical and/or electronic control signal, the electric motor 12a of the machine tool 10a is switched off and/or disconnected from a powertrain of the machine tool 10a via a coupling of the machine tool 10a. It is also conceivable that a set rotation speed of the electric motor 12a of the machine tool 10a is adjusted via the control signal by means of the analysis unit 28a. Preferably, a rotation speed of the electric motor 12a is set by means of the control and/or regulating unit 38a of the machine tool 10a as a function of the predetermined adjusted set rotation speed. Alternatively or additionally, it is conceivable that by means of the electrical and/or electronic control signal, in particular in the event of a jamming of the machining tool during a deflection, a motor current of the electric motor 12a is briefly increased, in particular to break loose the machining tool. Alternatively or additionally, it is conceivable that a rotation speed of the electric motor 12a is reduced, in particular temporarily, by means of the electrical and/or electronic control signal. Preferably, in a further method step 88a of the method 24a, in particular after a predetermined time interval or upon detection of a further electrical and/or electronic control signal, the analysis unit 28a puts the machine tool 10a, in particular the electric motor 12a back into a regular operating state for machining a workpiece. In particular, when the control signal is output by means of the analysis unit 28a, at least one output unit 32a of the machine tool 10a is controlled. Preferably, in particular upon identification of a deflection or of a breakdown, the output unit 32a outputs the acoustic signal designed as an acoustic warning signal, as a function of the control signal, preferably in order to warn a user of the machine tool 10a and/or other persons in a vicinity of the machine tool 10a.

It is conceivable that in a, in particular a further, method step 88a of the method 24a, a shape and/or a type of the electronic control signal to be output is specified by means of the operator interface 30a. In particular, the shape and/or the type of the electronic control signal to be output is selected by a user or an external unit via the operator interface 30a and is set in the analysis unit 28a. For example, by means of the operator interface 30a, the response of the machine tool 10a to an identification of a deflection or of a breakdown of the machine tool 10a is adjusted as a function of a workpiece to be machined or of a machining location of the machine tool 10a. In particular, the shape and/or type of the electronic control signal to be output determines a response of the machine tool to the identification of the deflection or of the breakdown. In a further method step 90a of the method 24a, the electric motor 12a is decelerated or deactivated or a rotation speed of the electric motor 12a is set by means of the control and/or regulating unit 38a as a function of the output control signal, in particular the shape and/or type of the control signal.

FIGS. 5 to 11 show further exemplary embodiments of the disclosure. The following descriptions and the drawings are substantially limited to the differences between the exemplary embodiments, wherein reference can basically also be made to the drawings and/or the description of the other exemplary embodiments, in particular of FIGS. 1 to 4, with respect to identically designated components, in particular with respect to components having the same reference signs. In order to distinguish the exemplary embodiments, the letter a is added to the reference signs of the exemplary embodiment in FIGS. 1 to 4. In the exemplary embodiments of FIGS. 5 to 11, the letter a is replaced by letters b to d.

Figure 5:
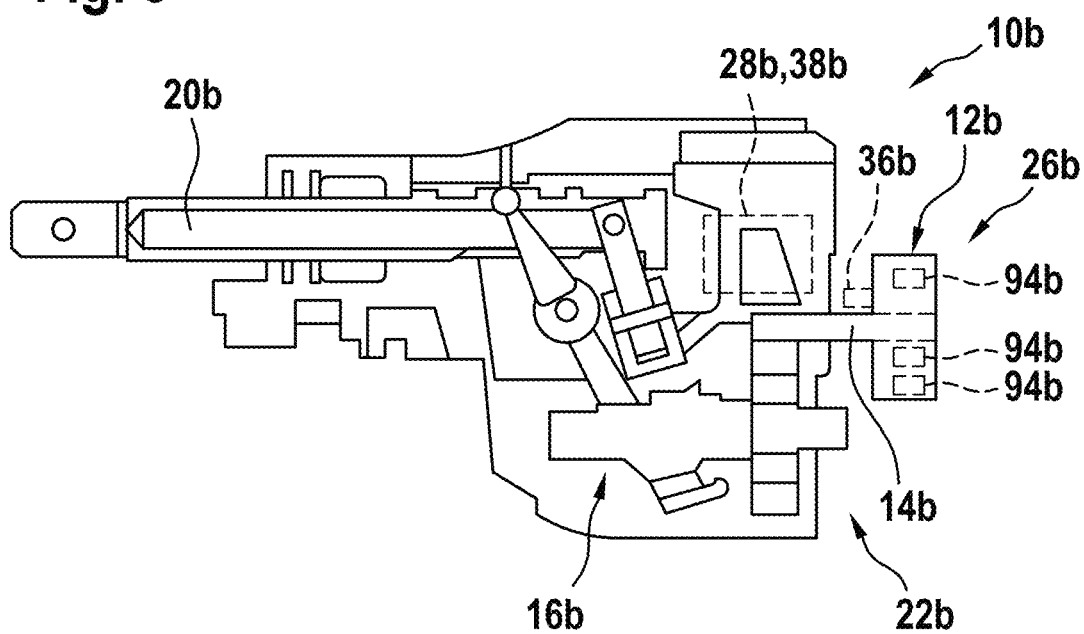

FIG. 5 shows an alternative embodiment of a machine tool 10b with a device 22b for performing a method 24b (see FIG. 7) for identifying a deflection or a breakdown of the machine tool 10b. The machine tool 10b has a linearly oscillating output movement. The machine tool 10b is designed as an electric hand-held machine tool 10b, in particular a saber saw. However, other embodiments of the machine tool 10*b* are also conceivable. The device 22*b* comprises a detection unit 26*b* and an analysis unit 28*b*. The machine tool 10*b* shown in FIG. 5 has a design at least substantially analogous to the machine tool 10*a* described in the description of FIGS. 1 to 4, so that reference can be made at least substantially to the description of FIGS. 1 to 4 with respect to a design of the machine tool 10*b* shown in FIG. 5. Unlike the machine tool 10*a* described in the description of FIGS. 1 to 4, the machine tool 10*b* shown in FIG. 5 comprises, in particular instead of an oscillating drive, preferably a wobble drive provided to convert a rotation of a drive shaft 14*b* of an electric motor 12*b* of the machine tool 10*b* into the linearly oscillating output movement of a lift rod 20*b* of the machine tool 10*b*. Preferably, the lift rod 20*b* is provided to transfer the output movement to a machining tool of the machine tool 10*b* (not shown in FIG. 5), which is in particular arranged on the lift rod 20*b*. In particular, the lift rod 20*b* is moved away from the electric motor 12*b* during a forward stroke of the output movement, and is subsequently again moved toward the electric motor 12*b* during a return stroke. The detection unit 26*b* comprises a plurality of Hall probes 94*b* each provided for detecting a magnetic field characteristic of the electric motor 12*b*. However, it is also conceivable that the detection unit 26*b* comprises only one Hall probe 94*b*. Preferably, the detection unit 26*b* and/or the analysis unit 28*b* are/is provided to determine, as a function of the magnetic field characteristic, a physical characteristic and/or a position characteristic in order to identify a deflection or a breakdown of the machine tool 10*b*. The Hall probes 94*b* are in particular arranged in a close range of the electric motor 12*b*, in particular of a rotor of the electric motor 12*b*. The Hall probes 94*b* are in particular each provided for detecting a magnetic field which is generated by means of magnets attached to the rotor and changes periodically due to a rotation of the rotor (see FIG. 6). The detection unit 26*b* comprises, in particular analogously to the detection unit 26*a* of the machine tool 10*a* described in FIGS. 1 to 4, a sensor element 36*b* for detecting the physical characteristic of the machine tool 10*b* designed as the rotation speed of the electric motor 12*b*.

Figure 6:
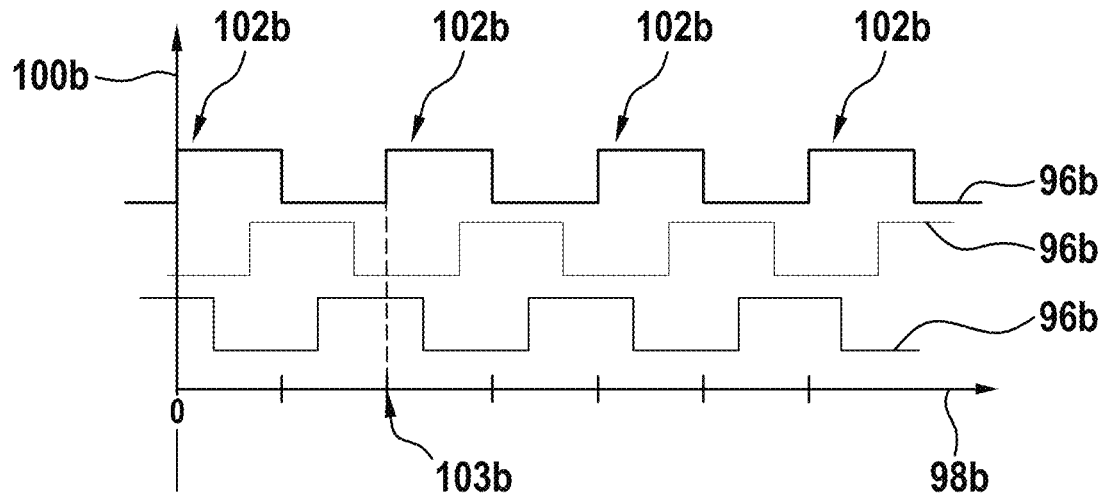

FIG. 6 shows exemplary measurements of three time curves 96*b* of the magnetic field characteristic of the electric motor 12*b* detected by means of the Hall probes 94*b*. An abscissa 98*b* indicates an angle that has been traversed relative to a reference point by the rotor, wherein the reference point is arranged in the zero point in the coordinate system shown in FIG. 6. An ordinate 100*b* represents the magnetic field characteristic which is designed as the electric voltage generated via the Hall probes 94*a* and is induced by the variable magnetic field of the electric motor 12*b*. The electric motor 12*b* is preferably designed as a three-phase electric motor, wherein in particular in FIG. 6, a time curve of the magnetic field characteristic detected via one of the Hall probes 94*b* is shown. In particular, the electric motor 12*b* comprises six coils, wherein two coils each of the six coils form a coil pair and are controlled synchronously with an electric current during a commutation of the electric motor 12*b*. The time curves 96*b* of the magnetic field characteristic each have three specific signal curves 102*b* designed as rectangular pulses per complete revolution of the rotor. Particularly preferably, the specific signal curve(s) used by means of the analysis unit is/are designed as a rising edge of the rectangular pulse. The analysis unit 28*b* is provided to determine a detection time 103*b* (shown, by way of example, in FIG. 6) of at least one specific signal curve 102*b* of the specific signal curves 102*b* and to associate a number according to an order of this specific signal curve 102*b* within a period of the linearly oscillating output movement. In particular, each of the specific signal curves 102*b* repeats periodically exactly once during the output movement, in particular taking into account the order of the specific signal curves 102*b* within a period of the linearly oscillating output movement. Preferably, a determined detection time of a thus numbered specific signal curve 102*b* in the time curve 96*b* of the magnetic field characteristic is designed as a position characteristic. The analysis unit 28*b* is provided to identify a deflection or a breakdown of the machine tool 10*b* as a function of at least two values, which are detected at different times, of the characteristic, designed as the rotation speed of the electric motor 12*b*, of the machine tool 10*b*, wherein the at least two values of the characteristic are associated with a respective at least substantially identical value of the position characteristic, designed as the detection time of a specific signal curve 102*b* in the time curve 96*b* of the magnetic field characteristic, of the linearly oscillating output movement of the machine tool 10*b*. In particular, only a detected time curve 96*b* of the magnetic field characteristic is sufficient to identify a deflection or a breakdown of the machine tool 10*b* by means of the analysis unit 28*b*.

Alternatively, it is conceivable that the analysis unit 28*b* is provided to determine the physical characteristic from the detected magnetic field characteristic. In particular, the analysis unit 28*b* is provided to determine the characteristic as a function of a determined detection time of a detected and/or determined specific signal curve 102*b* within a time curve 96*b* of the magnetic field characteristic. For example, the characteristic is designed as a time interval between at least two specific signal curves 102*b*, which are in particular respectively detected within different periods of the linearly oscillating output movement. Alternatively, it is also conceivable that the characteristic is designed as a clock frequency of half-bridges of the electric motor 12*b* designed as a brushless DC motor or as a frequency of a phase current of the electric motor 12*b*.

Figure 7:
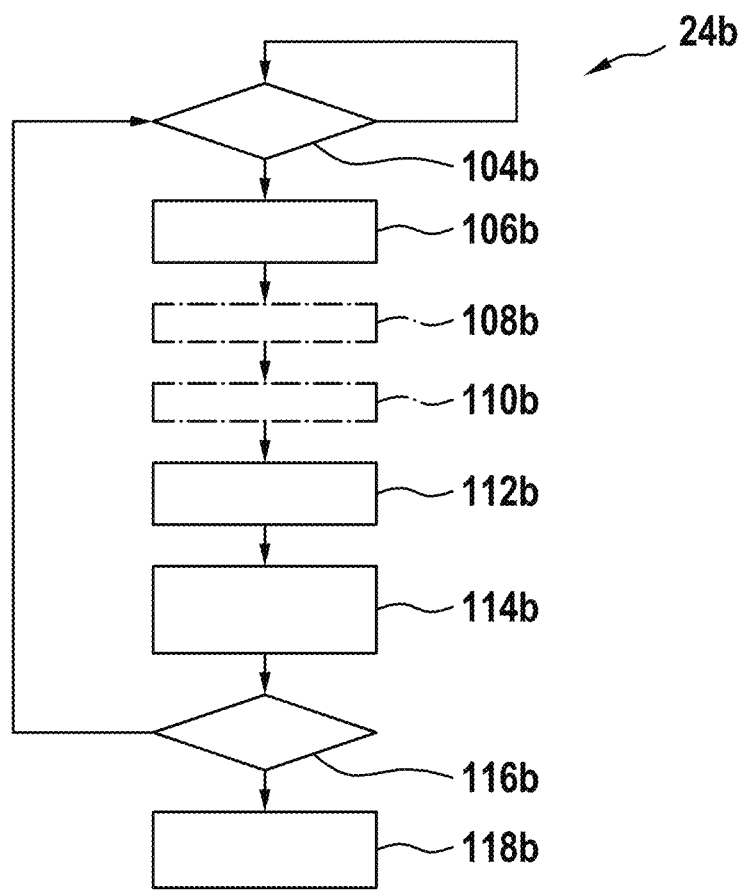

FIG. 7 shows an exemplary sequence of an alternative embodiment of the method 24*b* for identifying a deflection or a breakdown of the machine tool 10*b* with the linearly oscillating output movement. The method 24*b* shown in FIG. 7 has an at least substantially analogous design to the method 24*a* described in the description of FIG. 4. Preferably, the sequence shown of the method steps of the method 24*b* corresponds to an algorithm performed via the analysis unit 28*b* in order to identify a deflection or a breakdown of the machine tool 10*b*. Preferably, the algorithm is performed repeatedly, in particular until a deflection or a breakdown of the machine tool 10*b* is identified. In a method step 104*b* of the method 24*b*, the detection unit 26*b* detects a magnetic field characteristic of the electric motor 12*b* of the machine tool 10*b* and the analysis unit 28*b* checks whether a specific signal curve is present in the detected time curve 96*b* of the magnetic characteristic. In a further method step 106*b* of the method 24*b*, the analysis unit 28*b* calculates a time interval between a detection time of the specific signal curve and a detection time of a last-detected specific signal curve, in particular if a specific signal curve is identified. In a further method step 108*b* of the method 24*b*, the characteristic is determined by means of the analysis unit 28*b* as a function of the detected magnetic field characteristic, wherein, in particular, as a function of the calculated time interval, a value of the physical characteristic of the machine tool 10*b* designed as the rotation speed of the electric motor 12*b* is determined. Preferably, by means of the analysis unit 28*b*, a value of a position characteristic is associated with the determined value of the characteristic as a function of a detection time, wherein, in particular, the position characteristic is designed as a number of the specific signal which corresponds to the value of the characteristic and via which the value of the characteristic was in particular determined in method step 108b, in an order of specific signals within a period of the linearly oscillating output movement. In particular, the position characteristic is determined by means of the analysis unit 28b as a function of the detected magnetic field characteristic. Preferably, at least one translation parameter of a transmission 16b of the machine tool 10b is used to determine the position characteristic, in particular in method step 108b, by means of the analysis unit 28b, wherein a number of specific signal curves of the magnetic field characteristic is calculated, which is used to determine a length of the period of the linearly oscillating output movement relative to the time curve of the magnetic field characteristic. In particular, in order to determine the position characteristic, a number of specific signal curves of the magnetic field characteristic within the period of the linearly oscillating output movement is determined by means of the analysis unit 28b as a function of the translation parameter. In a further method step 110b of the method 24b, the determined time curve of the characteristic is filtered by means of the analysis unit 28b. In a further method step 112b of the method 24b, the determined time curve of the characteristic is stored in the analysis unit 28b. It is conceivable that in a method step of the method 24b, in particular the method step 112b, at least one value of the position characteristic is respectively associated with detected values of the characteristic by means of the analysis unit 28b as a function of a detection time of the individual values. In a further method step 114b of the method 24b, the determined value of the characteristic designed as a rotation speed is compared to a previously determined other value of the characteristic by means of the analysis unit 28b, wherein an identical value of the position characteristic is associated with the value of the characteristic and the other value of the characteristic. In a method step of the method 24b, in particular the method step 114b, the two values, which are detected at different times, of the characteristic, in particular the value and the other value, are selected by means of the analysis unit 28b in order to identify a deflection or a breakdown of the machine tool 10b, in such a manner that a difference of detection times of the at least two values of the characteristic is at least substantially exactly one period of the oscillating, in particular linearly oscillating, output movement. It is also conceivable that the difference of the detection times of the at least two values of the characteristic is at least substantially an integer multiple of a period of the oscillating, in particular linearly oscillating, output movement. In particular, a difference or a quotient of the value and the other value is formed by means of the analysis unit 28b for a comparison of the value and the other value. In a further method step 116b of the method 24b, the formed difference or the formed quotient of the two values, which are detected at different times, of the characteristic is determined by means of the analysis unit 28b and is compared to a limit value in order to identify a deflection or a breakdown of the machine tool 10b. If an exceedance of the limit value is determined by means of the analysis unit 28b, an electronic control signal is output in a further method step 118b of the method 24b by means of the analysis unit 28b in order to signal a breakdown or a deflection. In particular, by means of the electronic control signal and by means of a control and/or regulating unit 38b of the machine tool 10b, the electric motor 12b is deactivated or decelerated, the electric motor 12b is disconnected from the transmission 16b, a brake of the machining tool is activated, or the like. If the determined difference or the determined quotient does not exceed the limit value, the detected magnetic field characteristic is repeatedly checked for a specific signal curve by means of the analysis unit 28b according to method step 104b.

In addition, it is conceivable that in a method step of the method 24b, a shape and/or a type of an electronic control signal to be output is specified by means of an operator interface (not shown in the figures) of the machine tool 10b, wherein in at least one further method step of the method 24b, in particular the method step 118b, the electronic control signal is output by means of the analysis unit upon identification of a deflection or of a breakdown of the machine tool 10b.

Alternatively, it is conceivable that the physical characteristic for identifying a deflection or a breakdown is designed as a characteristic which is different from the rotation speed of the electric motor 12b and is determined in particular by means of the analysis unit 28b as a function of the detected magnetic field characteristic. For example, it is conceivable that in a method step of the method 24b, in particular the method step 108b, the analysis unit 28b determines the characteristic as a function of a detection time of a detected specific signal curve within a time curve of the magnetic field characteristic, wherein the specific signal curve repeats periodically, in particular exactly once, during the output movement. Alternatively, it is conceivable that, instead of the magnetic field characteristic, a different characteristic of the electric motor 12b is used to determine the physical characteristic of the machine tool 10b, in particular designed as the rotation speed of the electric motor 12b. For example, it is conceivable that the physical characteristic of the machine tool 10b, which is in particular designed as the rotation speed of the electric motor 12b, is determined by means of the analysis unit 28b as a function of a current characteristic of the electric motor 12b. Preferably, the current characteristic is designed as an electric current of the electric motor 12b, with which at least one coil pair of the electric motor 12b is controlled. In particular, the sequence of the method 24b described above for identifying a deflection or a breakdown of the machine tool 10b is analogously conceivable with the current characteristic instead of the magnetic field characteristic.

Figure 8:
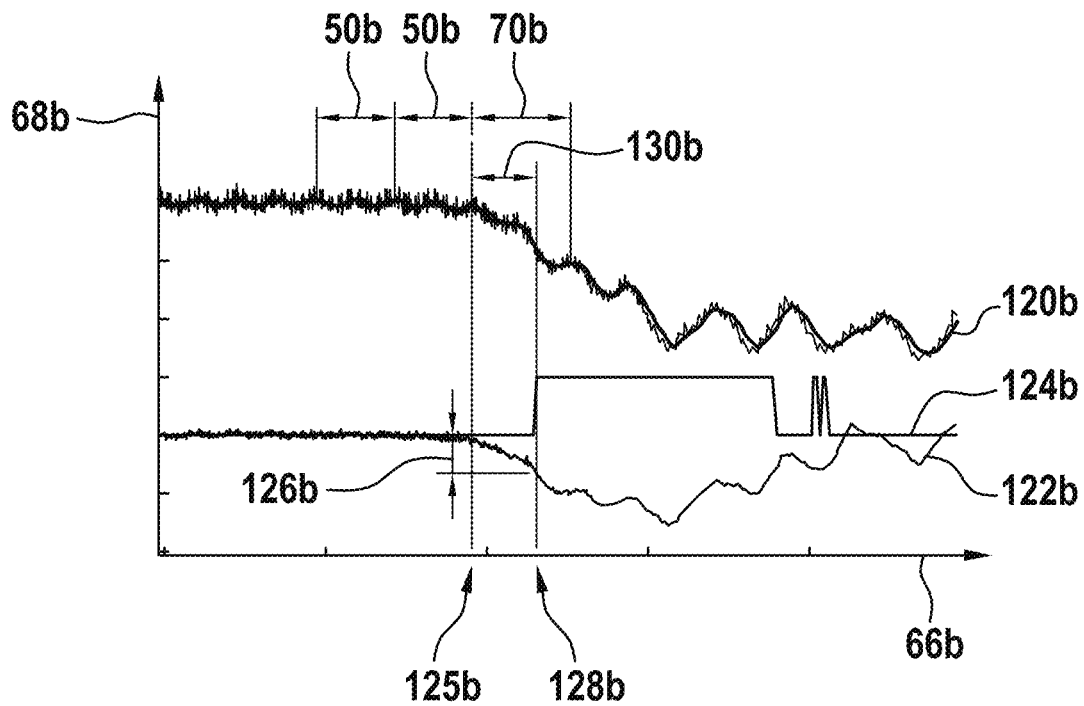

FIG. 8 shows an exemplary measurement of time curves of the rotation speed of the electric motor 12b of the machine tool 10b, of the determined difference of the two values, which are detected at different times, of the characteristic for identifying a deflection or a breakdown of the machine tool 10b, and of the control signal output by means of the analysis unit 28b, upon detection of a deflection of the machine tool 10b. An abscissa 66b represents the time, wherein a deflection of the machine tool 10b takes place at a time point 125b. For the three graphs 120b, 122b, 124b shown, an ordinate 68b represents the rotation speed of the electric motor 12b, the determined difference of the two values of the rotation speed of the electric motor 12b, and a signal strength of the control signal. A first graph 120b represents the time curve of the characteristic designed as the rotation speed of the electric motor 12b. A second graph 122b represents the time curve of the determined difference of the two values, which are detected at different times, of the characteristic. A third graph 124b represents the time curve of the control signal output by means of the analysis unit 28b. If the determined difference of the two values of the characteristic exceeds the limit value 126b at a time point 128b, the deflection of the machine tool 10b is identified by means of the analysis unit 28b and the control signal is output, which can be seen in particular in the third graph 124b. In particular, a time interval 130b between the time point 125b of the deflection and the time point 128b of the identification of the deflection by the analysis unit 28b is shorter than a period 70b of the output movement. Preferably, a plurality of specific signal curves in the time curve of the detected magnetic field characteristic are used by means of the analysis unit 28b to identify a deflection or a breakdown. In particular, the time interval 130b between the time point 125b of the deflection and the time point 128b of the identification of the deflection by the analysis unit 28b is less than a duration of the period 50b of the linearly oscillating output movement during idle operation prior to the deflection.

Figure 9:
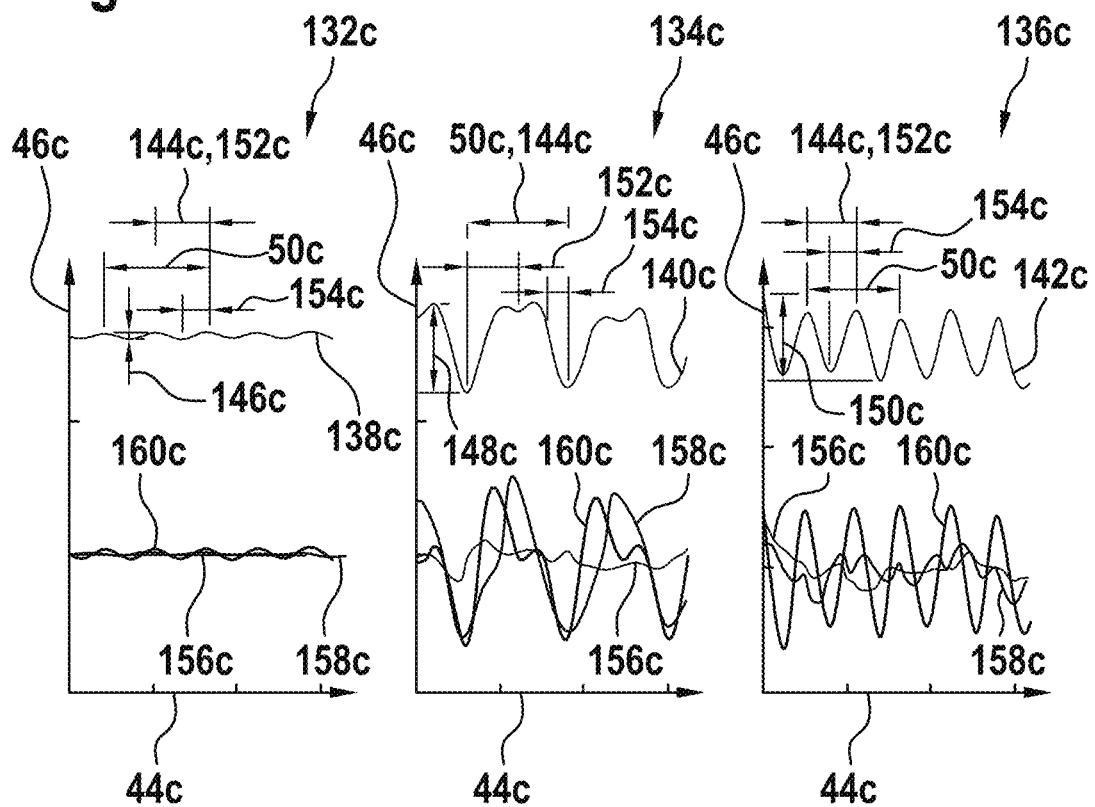

FIG. 9 shows exemplary measurements of a rotation speed of an electric motor 12c of a machine tool 10c in an idle operation of the machine tool 10c, during a machining operation, in particular a sawing operation, of the machine tool 10c and during a deflection of the machine tool 10c. The machine tool 10c described with reference to FIG. 9 has a design at least substantially analogous to the machine tool 10a described in the description of FIGS. 1 to 4 or to the machine tool 10b described in FIG. 5, so that reference can be made at least substantially to the description of FIGS. 1 to 4 or FIG. 5 with respect to a design of the machine tool 10b described with reference to FIG. 9. Abscissas 44c of the plots 132c, 134c, 136c shown in FIG. respectively indicate the time, with ordinates 46c of the plots 132c, 134c, 136c respectively indicating the rotation speed in rpm. A measurement during idle operation is shown in the left plot 132c, a top graph 138c representing the time curve of the rotation speed. A measurement during the machining operation is shown in the middle plot 134c, a top graph 140c representing the time curve of the rotation speed. A measurement during the deflection is shown in right left plot 136c, a top graph 142c representing the time curve of the rotation speed directly after the deflection. In another alternative embodiment of a method 24c for identifying a deflection or a breakdown of the machine tool 10c with an oscillating, in particular linearly oscillating, output movement, in at least one method step, a deflection or a breakdown of the machine tool 10c is identified by means of an analysis unit 28c of a device 22c of the machine tool 10c as a function of a ratio of a vibration frequency, which can be calculated from a period of vibration 144c, and a vibration amplitude 146c, 148c, 150c of a time curve of a rotation speed of a motor 12c of the machine tool 10c, which is determined at least as a function of the two values of the characteristic. The method 24c described with reference to FIG. 9 has a design at least substantially analogous to the method 24a described in the description of FIG. 4 or to the method 24b described in FIG. 7, so that reference can be made at least substantially to the description of FIG. 4 or FIG. with respect to a design of the method 24c described with reference to FIG. 9. In the measurements of the rotation speed of the motor 12c shown in FIG. 9, it can be seen that the ratios of the vibration frequency and the vibration amplitude 146c, 148c, 150c during an idle operation, during a machining operation and during a deflection respectively differ. In particular, the vibration frequency of the time curve of the rotation speed of the motor 12c is greater during the idle operation than during the machining operation, wherein the vibration amplitude 146c of the time curve of the rotation speed of motor 12c during idle operation is less than the vibration amplitude 148c during the machining operation. In particular, the vibration frequency of the time curve of the rotation speed of the motor 12c during the idle operation is at least substantially the same as in the case of the deflection, wherein the vibration amplitude 146c of the time curve of the rotation speed of motor 12c during the idle operation is less than the vibration amplitude 150c in the case of the deflection. In particular, the vibration frequency of the time curve of the rotation speed of the motor 12c is less during the machining operation than in the case of the deflection, wherein the vibration amplitude 148c of the time curve of the rotation speed of motor 12c during the machining operation is at least substantially the same as the vibration amplitude 150c in the case of the deflection. It is conceivable that the vibration frequency is determined by means of the analysis unit 28c from the time curve of the rotation speed of the motor 12c, for example by means of a fast Fourier transformation. Alternatively or additionally, it is conceivable that the analysis unit 28c determines, from the time curve of the rotation speed, time curves of signal differences from two values of the characteristic designed as a rotation speed, respectively over an entire period 50c of the oscillating, in particular linearly oscillating, output movement, over half a period 152c of the oscillating, in particular linearly oscillating, output movement and over a quarter period 154c of the oscillating, in particular linearly oscillating, output movement. These can respectively be seen in the bottom of plots 132c, 134c, 136c shown in FIG. 9, wherein in each case, a graph 156c shows a time curve of the signal difference of two values of the characteristic designed as the rotation speed over an entire period 50c of the oscillating, in particular linearly oscillating, output movement, a graph 158c shows a time curve of the signal difference of two values of the characteristic designed as rotation speed over half a period 152c of the oscillating, in particular linearly oscillating, output movement, and a graph 160c shows a time curve of the signal difference of two values of the characteristic designed as the rotation speed over an entire period 154c of the oscillating, in particular linearly oscillating, output movement. In particular, in order to determine the time curves of the signal differences, an instantaneous value of the rotation speed is respectively subtracted by means of the analysis unit 28c from a value of the rotation speed detected at a time before an entire period 50c, half a period 152c or a quarter period 154c of the output movement and is plotted over the time. In particular, it is conceivable that a deflection or a breakdown is identified by means of the analysis unit 28c as a function of the determined time curves of signal differences. For example, the determined time curves of signal differences by means of the analysis unit 28c are compared to a stored limit value and/or a previously determined value of the time curves of signal differences in order to identify a deflection or a breakdown.

Figure 10:
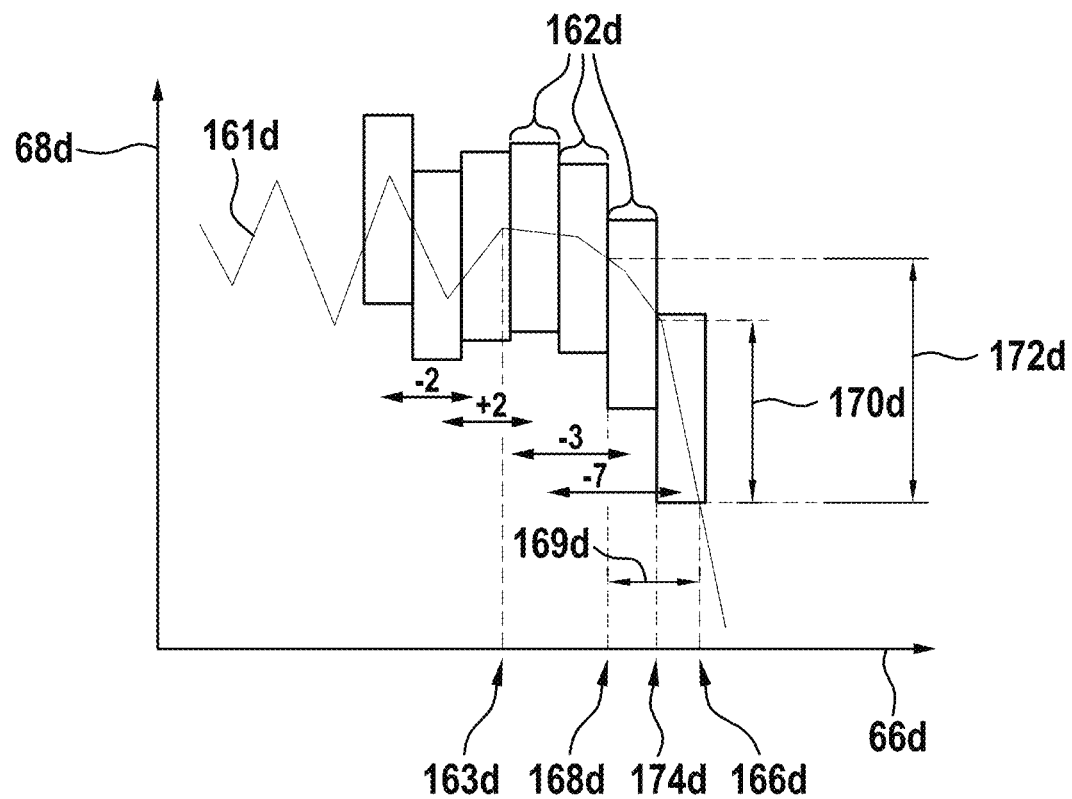

FIG. 10 shows a further exemplary measurement of a physical characteristic of the machine tool 10d formed as a rotation speed of a motor 12d of a machine tool 10d (not shown in the figures), during a deflection of the machine tool 10d. In particular, a time curve 161d of the characteristic designed as a rotation speed is shown in FIG. 10. An abscissa 66d shown in FIG. 10 represents the time. An ordinate 68d shown in FIG. represents the rotation speed of the motor 12d. The machine tool 10d described with reference to FIGS. 10 and 11 has a design at least substantially analogous to the machine tool 10a described in the description of FIGS. 1 to 4 or to the machine tool 10b described in FIG. 5, so that reference can be made at least substantially to the description of FIGS. 1 to 4 or FIG. 5 with respect to a design of the machine tool 10d shown in FIGS. 10 and 11.

In particular, the characteristic designed as the rotation speed of the motor 12*d* is detected by means of a detection unit 26*d* of a device 22*d* of the machine tool 10*d* or is determined by means of an analysis unit of the device 22*d*, for example as a function of a magnetic field characteristic or a current characteristic of the motor 12*d*. Preferably, a deflection or a breakdown is identified by means of the analysis unit 28*d* as a function of at least two values of the characteristic, which were in particular detected at different times, wherein a difference of detection times of the two values of the characteristic is greater than a time interval between two consecutively detected values of the characteristic. Preferably, the two values of the characteristic are not detected successively. In particular, at least another value of the characteristic is detected between the two values of the characteristic. The characteristic is detected by means of the detection unit 26*d* in time intervals 162*d* that are each at most 20 ms, preferably at most 10 ms, and more preferably at most 5 ms. Preferably, exactly one value of the characteristic is detected by means of the detection unit 26*d* per time interval 162*d*. In particular, the analysis unit 28*d* compares, in particular subtracts or divides, each detected value of the characteristic to at least one other previously detected value of the characteristic, wherein a comparison value, in particular a difference or a quotient, of these values is compared to the limit value 172*d* (shown, by way of example, in FIG. 10) in order to identify a deflection or a breakdown of the machine tool 10*d*. Particularly preferably, the detected value and the other previously detected value of the characteristic are detected at different times, wherein, in particular, a time interval 169*d* between a detection time 166*d* of the value of the characteristic and a detection time 168*d* of the other value of the characteristic detected before the value is greater than a time interval 162*d* of the detection of the characteristic by the detection unit 26*d*. The deflection takes place at a time point 163*d*. At a time that at least substantially corresponds to the detection time 166*d*, an exceedance of the limit value 172*d* by the difference of the value of the characteristic detected at the detection time 166*d* and the value of the characteristic detected at the time point 168*d* is identified by means of the analysis unit 28*d*, wherein, in particular, a deflection or a breakdown of the machine tool 10*d* is identified. In particular, it can be clearly seen in FIG. 10 that a difference 170*d* of the value of the characteristic detected at the detection time 166*d* and a further value of the characteristic measured directly previously at a time point 174*d* does not yet exceed the limit value 172*d*, as a result of which the deflection or the breakdown would be identified only at a later time.

Figure 11:
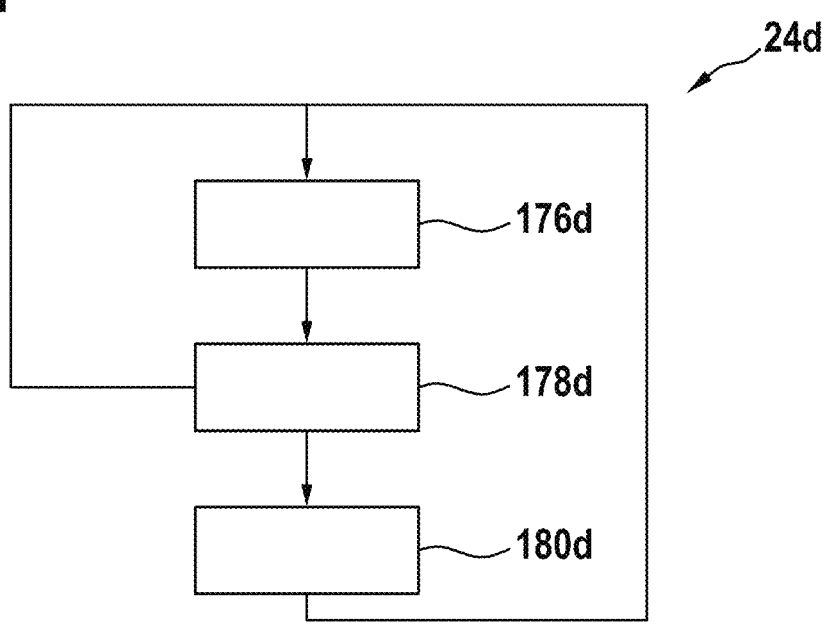

FIG. 11 shows an exemplary sequence of a further alternative embodiment of a method 24*d* for identifying a deflection or a breakdown of the machine tool 10*d* with the linearly oscillating output movement. Preferably, the sequence shown of the method steps of the method 24*d* corresponds to an algorithm performed via the analysis unit 28*d* in order to identify a deflection or a breakdown of the machine tool 10*d*. Preferably, the algorithm is performed repeatedly, in particular until a deflection or a breakdown of the machine tool 10*d* is identified. In a method step 176*d* of the method 24*d*, the physical characteristic of the machine tool 10*d* is continuously or periodically detected by means of the detection unit 26*d*. Particularly preferably, the characteristic is detected by means of the detection unit 26*d* in time intervals that are each at most 20 ms, preferably at most 10 ms, and more preferably at most 5 ms. In a further method step 178*d* of the method 24*d*, a deflection or a breakdown of the machine tool 10*d* is identified by means of the analysis unit 28*d* as a function of at least two values of the characteristic, which were in particular detected at different times, wherein a difference of detection times of the two values of the characteristic is greater than a time interval between two consecutively detected values of the characteristic. In particular, each detected value of the characteristic is compared with a previously detected value of the characteristic by means of the analysis unit 28*d* in order to identify a deflection or a breakdown of the machine tool 10*d*. Preferably, the analysis unit 28*d* uses at least substantially all detected values of the characteristic to identify a deflection or a breakdown of the machine tool 10*d*. In particular, a difference of a quotient of the two values of the characteristic is determined and compared to the limit value by means of the analysis unit 28*d* in order to identify a deflection or a breakdown of the machine tool 10*d*. Preferably, a deflection or a breakdown of the machine tool 10*d* is identified by means of the analysis unit 28*d* when the limit value is exceeded by the difference or the quotient. In particular, in a further method step 180*d* of the method 24*d*, upon identification of a deflection or of a breakdown, a control signal to deactivate or brake the motor 12*d*, to disconnect the motor 12*d* from a powertrain of the machine tool 10*d*, to activate a braking system of the machine tool 10*d*, in particular to brake the machining tool or the like is output by means of the analysis unit 28*d*. If, in a comparison of the difference or the quotient of the two values of the characteristic with the limit value, no exceedance of the limit value is determined by means of the analysis unit 28*d*, a further comparison of a new detected value of the characteristic takes place repeatedly according to method step 178*d*.

The invention claimed is:

1. A method for identifying a deflection or a breakdown of a hand-held machine tool configured as a saber saw, jigsaw, or electric handsaw with an oscillating output movement, the method comprising:
   continuously or periodically detecting at least one physical characteristic of an electric motor of the machine tool with a detection unit; and
   identifying, with an analysis unit, a deflection or a breakdown of the machine tool as a function of at least two values, which are detected at different times, of the at least one physical characteristic of the electric motor, wherein the at least two values of the at least one physical characteristic are associated with a respective at least substantially identical value of a discrete position characteristic of the oscillating output movement of the machine tool.

2. The method according to claim 1, further comprising:
   associating, with the analysis unit, at least one value of the discrete position characteristic with respective detected values of the characteristic as a function of a detection time.

3. The method according to claim 1, further comprising:
   with the analysis unit, determining a difference or a quotient of the at least two values, which are detected at different times, of the characteristic and comparing the difference or quotient to at least one limit value to identify the deflection or the breakdown of the machine tool.

4. The method according to claim 1, wherein:
   the detecting of the at least one physical characteristic comprises detecting a magnetic field characteristic or a current characteristic of the electric motor of the machine tool with the detection unit, and
   the identifying of the deflection or breakdown of the machine tool further comprises determining, with the analysis unit, the at least one physical characteristic and/or the position characteristic as a function of the detected magnetic field characteristic or current characteristic.

5. The method according to claim 4, wherein the determining of the at least one physical characteristic and/or the position characteristic includes determining the characteristic as a function of a detection time of a detected specific signal curve within a time curve of the magnetic field characteristic or of the current characteristic, wherein the specific signal curve repeats periodically during the output movement.

6. The method according to claim 5, wherein the specific signal curve repeats exactly once during the output movement.

7. The method according to claim 4, wherein the determining of the at least one physical characteristic and/or the position characteristic includes using at least one translation parameter of a transmission of the machine tool to determine the position characteristic.

8. The method according to claim 1, wherein the at least two values, which are detected at different times, of the at least one physical characteristic are selected by means of the analysis unit in order to identify the deflection or the breakdown of the machine tool, in such a manner that a difference of detection times of the at least two values of the characteristic is more than one period, at least substantially exactly one period or one at least substantially integer multiple of a period of the oscillating output movement.

9. The method according to claim 1, wherein the identifying of the deflection or the breakdown of the machine tool includes identifying, with the analysis unit, the deflection or the breakdown of the machine tool as a function of a ratio of a vibration frequency and a vibration amplitude of a time curve of a rotation speed of the electric motor of the machine tool, which are determined at least as a function of the two values of the at least one physical characteristic.

10. The method according to claim 1, further comprising:
specifying a shape and/or a type of an electronic control signal to be output with an operator interface; and
outputting the electronic control signal via the analysis unit upon identification of the deflection or the breakdown of the machine tool.

11. The method according to claim 1, wherein the oscillating output movement is a linearly oscillating output movement.

12. A device for identifying a deflection or a breakdown of a hand-held machine tool configured as a saber saw, jigsaw, or electric handsaw with an oscillating output movement, the device comprising:
at least one detection unit configured to continuously or periodically detect at least one physical characteristic of an electric motor of the machine tool; and
at least one analysis unit configured to identify the deflection or the breakdown of the machine tool as a function of at least two values, which are detected at different times, of the at least one physical characteristic of the motor,
wherein the at least two values of the at least one physical characteristic are associated with a respective at least substantially identical value of a discrete position characteristic of the oscillating output movement of the machine tool.

13. The device according to claim 12, wherein the oscillating output movement is a linearly oscillating output movement.

14. A machine tool configured as a saber saw, a jigsaw, or an electric handsaw with an oscillating output movement, the machine tool comprising:
an electric motor; and
a device comprising:
at least one detection unit configured to continuously or periodically detect at least one physical characteristic of the electric motor of the machine tool; and
at least one analysis unit configured to identify the deflection or the breakdown of the machine tool as a function of at least two values, which are detected at different times, of the at least one physical characteristic of the electric motor,
wherein the at least two values of the at least one physical characteristic are associated with a respective at least substantially identical value of a discrete position characteristic of the oscillating output movement of the machine tool.

15. The machine tool according to claim 14, wherein the oscillating output movement is a linearly oscillating output movement.

* * * * *